US005691605A

United States Patent [19]
Xia et al.

[11] Patent Number: 5,691,605
[45] Date of Patent: Nov. 25, 1997

[54] ELECTRONIC BALLAST WITH INTERFACE CIRCUITRY FOR MULTIPLE DIMMING INPUTS

[75] Inventors: Yongping Xia; Joshua Zhu; Sreeraman Venkitasubrahmanian, all of Torrance; Raj Jayaraman, Rancho Palos Verdes, all of Calif.; Thomas Farkas, South Euclid, Ohio

[73] Assignee: Philips Electronics North America, New York, N.Y.

[21] Appl. No.: 512,868

[22] Filed: Aug. 9, 1995

Related U.S. Application Data

[63] Continuation-in-part of Ser. No. 414,859, Mar. 31, 1995, abandoned.

[51] Int. Cl.$^6$ .................................................. H02B 37/02
[52] U.S. Cl. .......................... 315/307; 315/DIG. 4; 315/224; 315/293
[58] Field of Search .......................... 315/307, DIG. 4, 315/224, 308, DIG. 7, 324, 292, 293, 314, 316

[56] References Cited

U.S. PATENT DOCUMENTS 5,182,702  1/1993  Hiramatsu et al. ............ 315/307
5,604,411  2/1997  Venkitasubrahmanian et al. . 315/DIG. 4

Primary Examiner—Robert Pascal
Assistant Examiner—Michael Shingleton
Attorney, Agent, or Firm—Edward Blocker

[57] ABSTRACT

A lamp controller includes an interface circuit, or receiver, which receives an input signal and decodes control signals supplied from a transmitting device, such as a power line wall controller, according to at least two of the following communication techniques: phase angle control, step control, and coded control. The receiver tests the input signal and identifies which type of control technique is employed by the wall controller connected to the lamp controller. The receiver then decodes the control command from the input signal. In a disclosed embodiment, the lamp controller is gas discharge lamp dimming ballast having a two wire input for connection to the hot dimmed and neutral leads of the power line controller. The ballast has an improved topology in which a pre-conditioner supplies a substantially constant DC voltage to a ballast stage including an inverter, a resonant tank output and a control circuit. The dim signal output by the receiver is independent of the DC rail voltage and, in combination with the maintenance of a substantially constant DC rail voltage, permits of improved dimming control while providing the ease of installation of a two wire ballast.

54 Claims, 23 Drawing Sheets

| 1 | CRECT | LI2 | 16 |
| 2 | VL | LI1 | 15 |
| 3 | CP | RIND | 14 |
| 4 | DIM | CF | 13 |
| 5 | NC | RREF | 12 |
| 6 | S1 | VDD | 11 |
| 7 | G1 | G2 | 10 |
| 8 | FVDD | GND | 9 |

FIG. 5

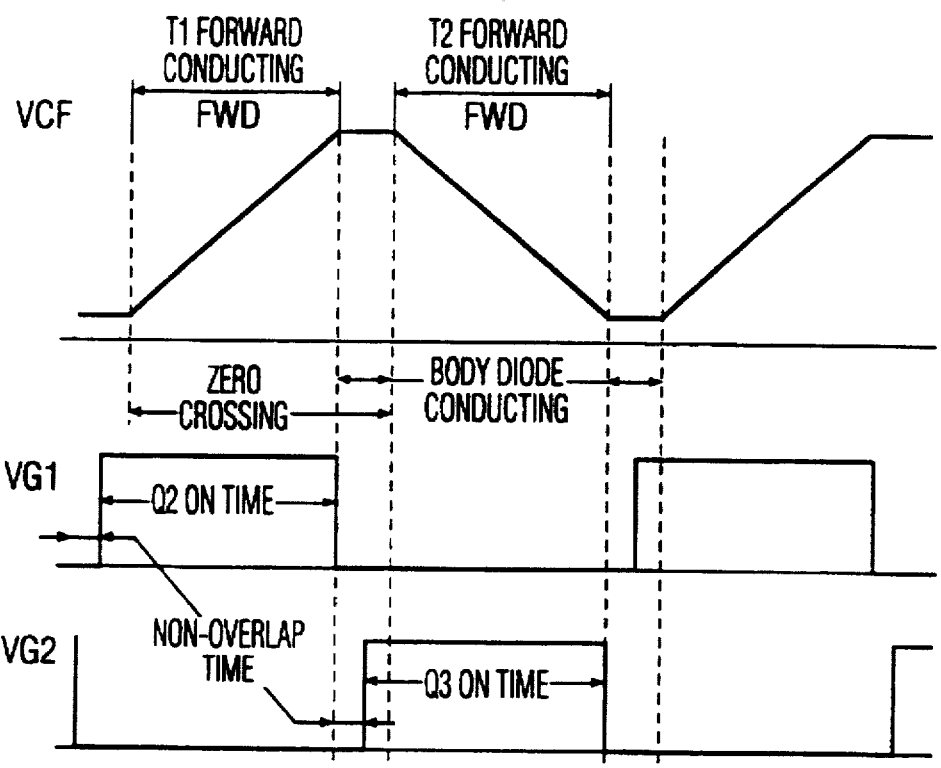

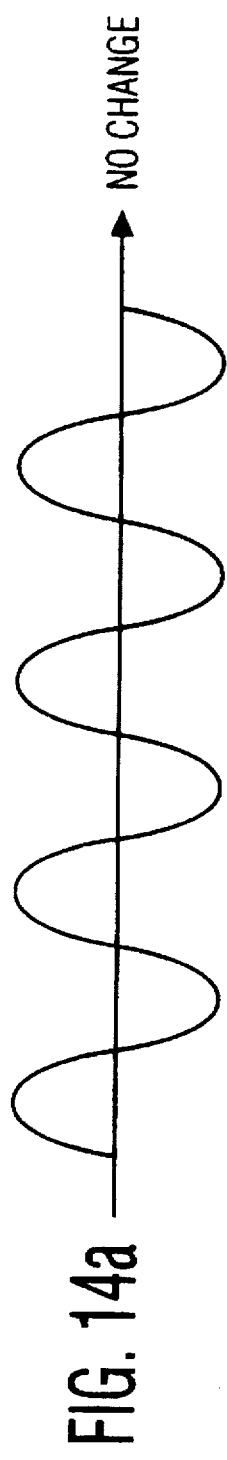
FIG. 14a — NO CHANGE
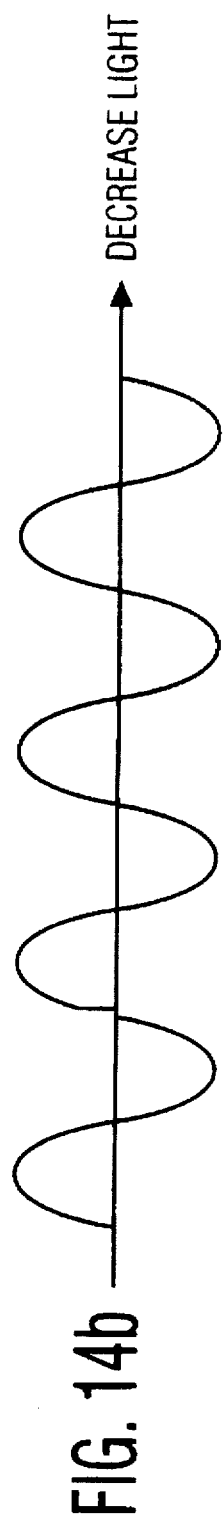
FIG. 14b — DECREASE LIGHT
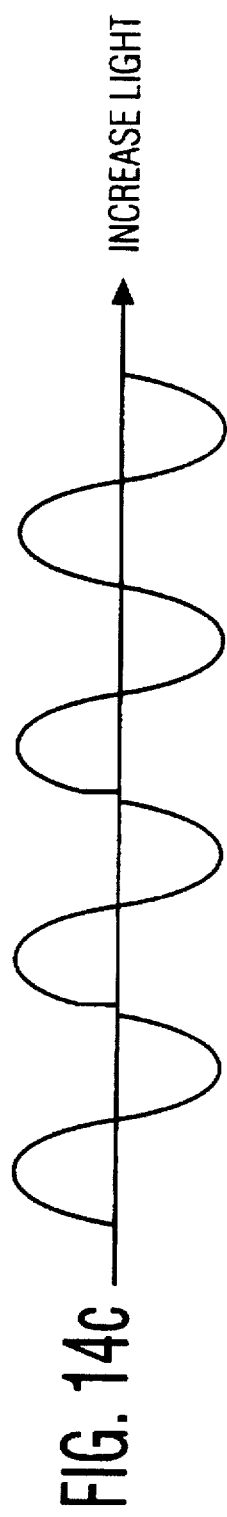
FIG. 14c — INCREASE LIGHT
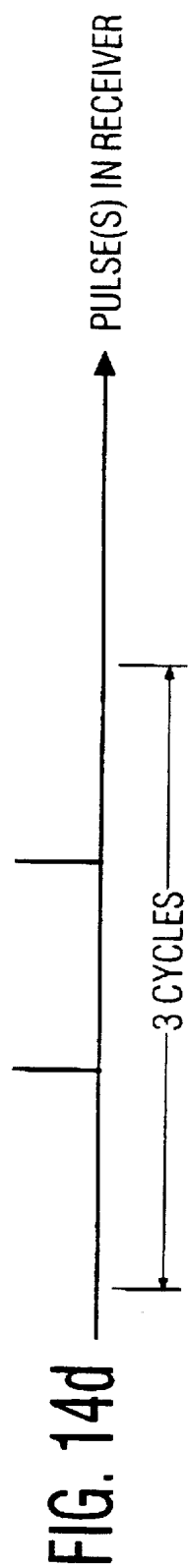
FIG. 14d — PULSE(S) IN RECEIVER (3 CYCLES)

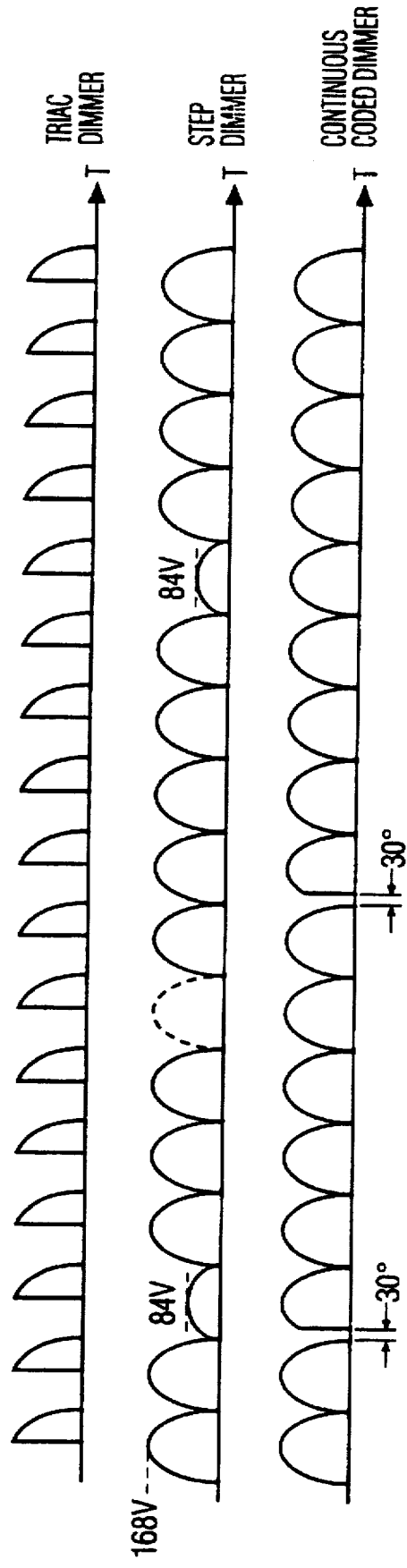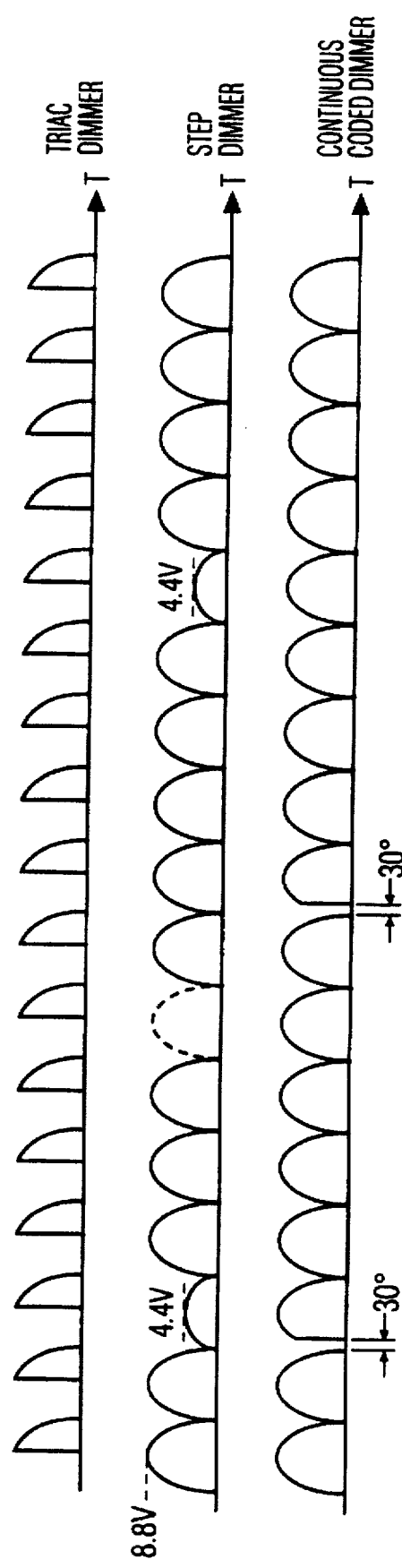
FIG. 17a
FIG. 17b

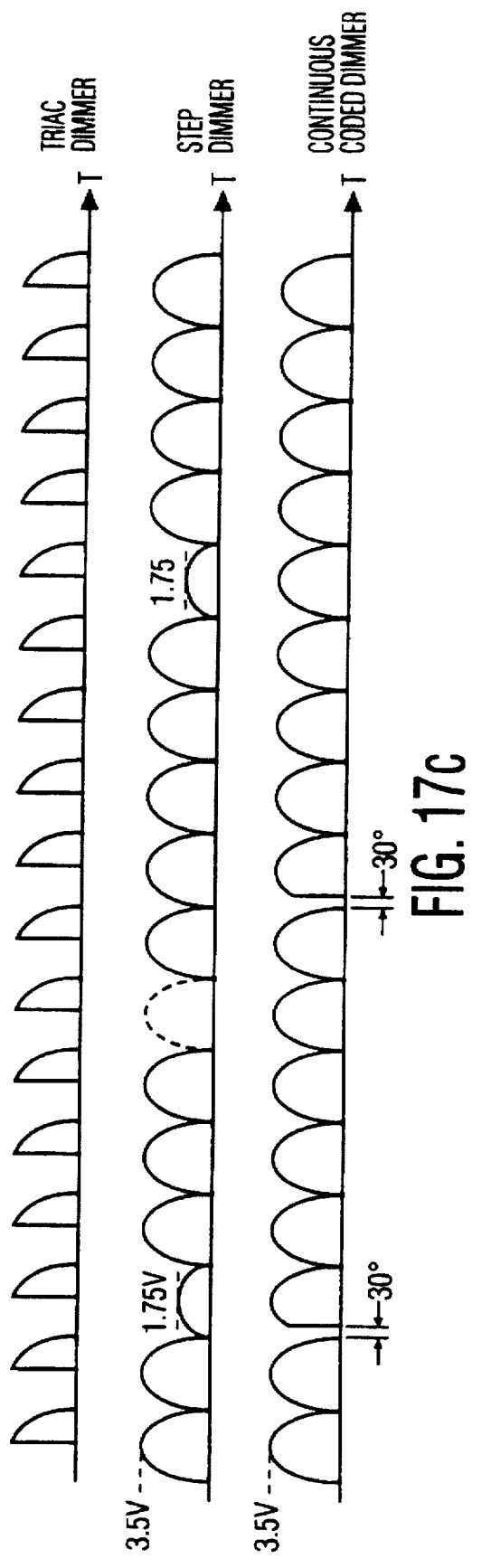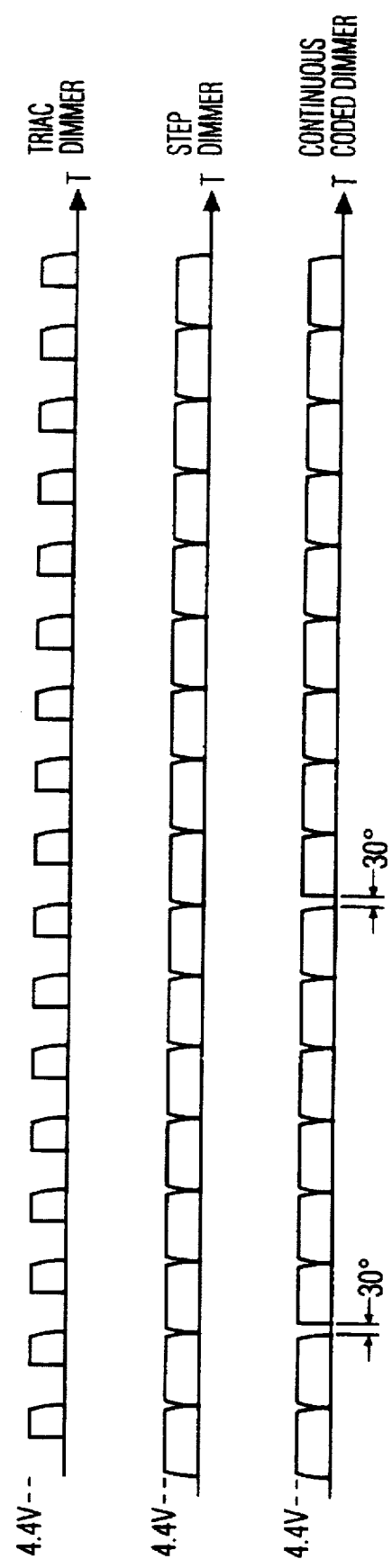

ELECTRONIC BALLAST WITH INTERFACE CIRCUITRY FOR MULTIPLE DIMMING INPUTS

CROSS REFERENCE TO RELATED APPLICATIONS

This is a continuation in part of U.S. application Ser. No. 08/414,859 filed Mar. 31, 1995 now abandoned, entitled "ELECTRONIC BALLAST WITH INTERFACE CIRCUITRY FOR PHASE ANGLE DIMMING CONTROL" of Sreeraman Venkitasubrahmanian, Raj Jayaraman, Yongping Xia, and Thomas Farkas.

BACKGROUND OF THE INVENTION

1. Field of the Invention

The invention generally concerns lamp controllers, such as ballasts, for controlling the operation of electric lamps. More particularly, the invention relates to a receiver of a lamp controller which interfaces with a remote device that transmits signals to control the operation of the lamp controller and associated lamp(s). The invention also relates to a method of decoding multiple dimming inputs.

2. Description of the Prior Art

Lamp ballasts are known in which dimming of gas discharge lamps, typically fluorescent lamps, is responsive to phase angle control of the alternating current ("AC") power line input by a control device remote from the ballast. Phase angle control involves the clipping of a portion of each half cycle of the AC sinusoidal power line voltage. A common type of phase angle controller, known generally as a forward phase dimmer, clips or blocks a portion of each positive and negative half cycle immediately after the zero crossing of the voltage. An example of a forward phase dimmer is the well known triac dimmer. Another type is the reverse phase dimmer, commonly known as an electronic dimmer, which passes the portion of the half-cycle immediately after the zero crossing and blocks the portion of the half cycle before the zero-crossing. In both types, the portion or angle of the half cycle which is blocked is adjustable.

Phase angle dimming in which the phase angle information is supplied by an additional wire separate from the power line inputs powering the ballast are known, for example, from JP-116698, U.S. Pat. No. 4,797,599, and DGM 9014982. Such ballasts are inconvenient in that their installation requires the running of the additional, dim-signal-carrying wire between the controller, which is typically mounted in a wall, and the ballast mounted in the fluorescent lamp fixture in the ceiling. This results in considerable labor costs and is an impediment to market acceptance.

Lamp ballasts are also known which are two-wire devices in which the phase cut signal is not separate from the mains supply but is carried by the hot power line input. These are more attractive, from an installation standpoint, than the three-wire devices and are known inter alia from U.S. Pat. No. 4,392,086 (Ide et al), U.S. Pat. No. 5,192,896 (Qin), U.S. Pat. No. 4,866,350 (Counts), U.S. Pat. No. 4,449,897 (Sairanen), and U.S. Pat. No. 5,101,142 (Chatfield).

A disadvantage of the above two-wire ballasts is that they each employ voltage control dimming, i.e. the light output of the lamps is effected through variation in the average line voltage, through control of the conduction angle by the triac or electronic dimmer, which in turn changes the ballast bus voltage feeding the ballast's inverter. The dimming level is inversely proportional to the phase angle blocked or cut from the mains voltage. No phase cut corresponds to a maximum light level while increased dimming (lower light level) corresponds to more phase cut. One adverse consequence is that in order to maintain the light level below 100%, the power line voltage must be maintained in a modified state, i.e. with every cycle having a phase cut portion. This adversely effects ballast performance in several ways. First, it lowers the power factor of the ballast during dimming. Secondly, it increases total harmonic distortion. Third, it increases stress on the circuit components. Fourth, it increases EMI, making it more difficult to meet known standards, especially for consumer use.

Another disadvantage is lamp flicker. When the input conduction angle of the line voltage from the phase angle dimmer falls below a certain value, the preconditioner may not be able to draw enough power to maintain the bus voltage at the required level while supplying power to the lamp driver circuitry. If the ballast is left to operate in this mode, the lamp cycles on and off, resulting in severe flicker. Still another disadvantage is limited dimming range. For example, in U.S. Pat. No. 5,101,142 the effective dimming range is limited to conduction angles of less than 90 degrees because at higher angles the output voltage of the preconditioner stays the same. The dimming range is limited at the low end to conduction angles at which the resulting bus voltage is high enough to maintain the compliance voltage sufficiently high so that the lamps don't extinguish. Yet another deficiency is the quality of light regulation. In response to a triac dimming input, the ballast of U.S. Pat. No. 5,101,142 provides a dimming control signal, which varies inverter switching frequency, derived from a bus voltage which varies with the input conduction angle. Thus, lamp light output is effected by two varying parameters, the bus voltage and the inverter switching frequency, which inhibits the accuracy of the dimming control.

U.S. Pat. No. 5,068,576 discloses a step dimmer arrangement in which the wall controller completely cuts or significantly reduces the voltage of an entire half-cycle, so that there is a missing half-cycle or a half-cycle of significantly reduced voltage in the rectified DC output of the ballast's rectifier. The number of half-cycles, or time period, between successive missing half-cycles represents a dimming command. For example, time "n" between missing half-cycles may represent a 70% dim level while time "m" between missing half-cycles represents a 90% dim level. In the disclosed ballast, the decoder controls the preconditioner circuit to control the DC rail voltage to the inverter, and thereby control the light level of the lamps. A missing half-cycle will cause a visual flicker in the lamp operated by the ballast. In the disclosed step-dimming ballast, the flicker is not so objectionable as the user expects a significant and abrupt change in the light output of the lamp when switching from one light level, e.g. 90% to the next, e.g. 75%.

However, where a continuous dimming effect is desired, i.e. where the light should be smoothly adjustable in very small increments, the complete cutting or significant voltage reduction of entire half-cycles from the mains supply (and the resulting flicker) would be objectionable to the user.

Another disadvantage of commercially available controllers is that the receiver in the ballast is dedicated to a particular type of wall controller. For example, ballasts which use phase angle dimming can only be used with phase angle wall controllers and not with wall controllers that supply a control signal via the step dimming method of, for example, U.S. Pat. No. 5,068,576. Even within the phase angle control technique, ballasts which employ forward phase angle dimming may be limited to use with triac-type wall controllers, and not with electronic (reverse phase angle) wall controllers. This dedication of the ballast to certain wall controllers, and vice versa, limits the flexibility for the consumer as well as the ballast manufacturer.

Accordingly, it is an object of the invention to provide a lamp controller with a receiver, a receiver for use with a lamp controller, and a method of decoding control signals, which overcome the above mentioned disadvantages of the prior art.

SUMMARY OF THE INVENTION

Generally speaking, according to one aspect of the invention a lamp controller includes an interface circuit, or receiver, which receives an input signal having a fundamental period with a nominal waveform. The receiver includes a decoder which can decode multiple received control commands encoded in the input signal according to any two of:

(i) a first control technique wherein commands are indicated by the phase angle of a phase angle cut in the nominal waveform;

(ii) a second control technique wherein commands are indicated by the number of fundamental periods between start and stop points of the command, the stop and start points being fundamental periods having a nominal voltage less than the nominal waveform; and (iii) a third control technique wherein commands are indicated by an occurrence signature of a pre-selected perturbation in the nominal waveform within a control period of a pre-selected number of fundamental periods.

The controller further includes circuitry for controlling the operation of the electric lamp in response to the decoded command. The decoder can decode an input signal from any one of at least two separate wall controllers each supplying a respective one of the signals of the first and second, the first and third or the second and third control techniques. Favorably, the receiver decodes commands encoded on the input signal according to each of the three control techniques.

The above-recited first and second control techniques correspond to the previously described dimming techniques for phase angle dimming and step dimming. The third control technique concerns a coded communication method, to be further described herein, in which generally no changes are made to the AC signal during steady lamp operation. The lamp controller according to the invention provides improved flexibility by allowing the user to select from more than one type of wall controller for installation with the lamp controller. This also permits the user to later connect a wall controller according to either of the other types decodeable by the receiver. Conversely, the ballast can be used in retrofit situations as long as any of the three types of wall controllers are present, without having to match the ballast to the wall controller. This simplifies logistics for the manufacturer as well as the customer.

According to another aspect of the invention, the receiver includes a respective decoder for each of the above-mentioned control techniques. The receiver includes circuitry which first samples the input signal to identify which control technique is employed. After identifying the control technique of the encoded commands, the respective decoder is activated to decode the control commands from the input signal. In the disclosed embodiment, portions of the identification and respective decoder circuitry are formed by program loops in a microcontroller.

According to another aspect of the invention, the identifying circuitry distinguishes between control commands from a triac type controller and those from the step and coded phase cut controllers by determining the number of phase cuts in a selected number of fundamental periods, or within a certain time period. The identifying circuitry includes circuitry which differentiates the input signal to generate a pulse for each occurrence of a phase cut in the input signal, which pulses are input to the microcontroller. The identifying circuitry also includes circuitry which distinguishes between the step type technique and the coded communication technique by detecting the presence of fundamental periods having a reduced voltage compared to the nominal, which mark the stop and start points for a step-type command. The identifying circuitry includes circuitry which generates a pulse for input to the microcontroller upon the occurrence of each start or stop point.

According to yet another aspect of the invention, the receiver first confirms whether the control signals in the input signal are encoded according to the first technique, and if so the respective decoding program loop is entered. If not, the receiver then confirms whether the input signal is encoded with commands according to the second technique. In the positive case, the decoding loop for the second technique is entered and, in the negative case, the program loop for the third (coded phase cut) technique is entered.

In a favorable embodiment, the lamp controller is a ballast for a gas discharge lamp. The ballast includes inputs for connection to an AC power supply, for powering the ballast and lamp, via a two-wire connection to a wall controller which encodes dimming control signals via either of said three control techniques. A ballasting stage has a pair of DC inputs at which a substantially constant DC voltage is received, and a dim input, separate from the DC inputs, for receiving a dimming signal. The ballasting stage controls the electrical power supplied to the gas discharge lamp at a level corresponding to the dimming signal. A power supply circuit connected to the mains input terminals provides the substantially constant DC voltage to the ballasting stage. The ballast includes a receiver, with the above-mentioned decoding features, which generates the dim signal for the dim input to control the dimming level of the lamp at a level corresponding to that indicated by the setting of the external wall controller. The dimming signal output by the receiver is independent of the DC voltage supplied to the DC inputs of the ballasting stage.

In contrast to the known two-wire dimming ballasts, the ballast according to the invention does not employ voltage dimming, i.e. a deliberate reduction in the DC rail voltage supplied to the ballast stage. By maintaining a substantially constant DC rail voltage, the ballasting stage can more readily control the illumination level of the lamps in response to the dimming signal than in the prior art two-wire ballasts in which both the dimming signal and the DC rail voltage input to the ballasting stage change simultaneously. Additionally, since the DC voltage input to the inverter does not decrease significantly as with the prior art two-wire ballasts for reduced conduction angle, but remains substantially constant, the increased compliance voltage necessary to keep the lamps lit at lower light levels is more readily achieved by the inverter for greater reductions in the conduction angle. Thus, the ballast topology according to the invention permits of a more precise control of the light level of the lamps over a large dimming range while maintaining the ease of installation and market acceptance of a two-wire ballast.

The invention also concerns a receiver for a ballast and a method for identifying and decoding an input signal having control signals encoded according to the three control techniques discussed.

These and other objects, features and advantages of the invention will become apparent with reference to the drawings, detailed description and claims.

BRIEF DESCRIPTION OF THE DRAWINGS

FIG. 2(a) shows circuit A, B and C; FIG. 2(b) shows circuit D; and FIG. 2(c) shows circuit I;

FIG. 5 shows the terminal pin arrangement for the IC U4 used in circuit D of FIG. 2(b);

FIGS. 9(a)–9(c) shows three waveforms illustrating the forward conductance control outputs of the controller U4;

FIGS. 14(a)–14(d) illustrate representative phase cut waveforms according to the coded communication technique according to the invention;

FIGS. 17(a)–17(f) illustrate dimming control waveforms for each of the three dimming methods at various nodes in the interface circuit of FIG. 2(b);

DETAILED DESCRIPTION OF THE PREFERRED EMBODIMENTS

Prior to discussing the coded communication method and interface circuitry according to the invention, a gas discharge lamp ballast will be described which is particularly suited as a platform for the interface circuitry and for implementing the coded communication technique.

Figure 1:
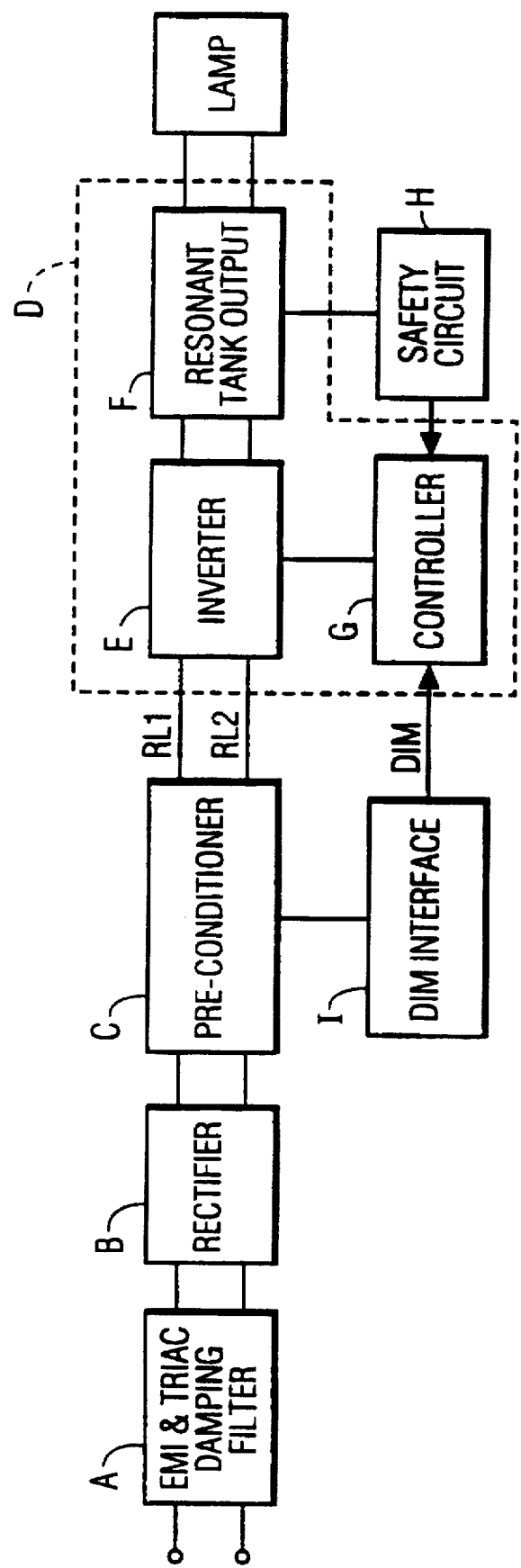
FIG. 1 is a block diagram of the ballast according to the invention.

The fluorescent lamp controller, or ballast, shown in FIG. 1 includes an EMI and triac damping filter "A" connected to full bridge input rectifier "B", which together convert an AC power line voltage into a rectified, filtered DC voltage at an output thereof. The pre-conditioner circuit "C" includes circuitry for active power factor correction, as well as for increasing and controlling the DC voltage from the rectifier circuit B, which DC voltage is provided across a pair of DC rails RL1, RL2. Circuit "D" is a ballast circuit for controlling operation of the lamp and includes a DC-AC converter, or inverter, "E", resonant tank output circuit "F" and controller "G" which controls the inverter. The inverter E is a half-bridge configuration which under control of the half-bridge controller, or driver, circuit G provides a high frequency substantially square wave output voltage to the output circuit F. The resonant tank output circuit F converts the substantially square wave output of the half-bridge into a sinusoidal lamp current.

The safety circuit "H" provides a back-up stop function which prevents an output voltage from being present at the lamp terminals when one or both of the fluorescent lamps has failed or has been removed from its socket. The safety circuit also restarts the controller G when it senses that both filament electrodes in each lamp are good.

A dimming interface circuit "I" is connected between an output of the rectifier circuit B and a control input of ballast circuit present at the controller G to control dimming of the lamp. The dimming interface circuitry provides a dimming voltage signal to the controller G in response to a dimming control signal from an external dimming controller.

CIRCUITS A;B: EMI and Triac Damping Filter; Full Bridge Rectifier

Figure 2A:
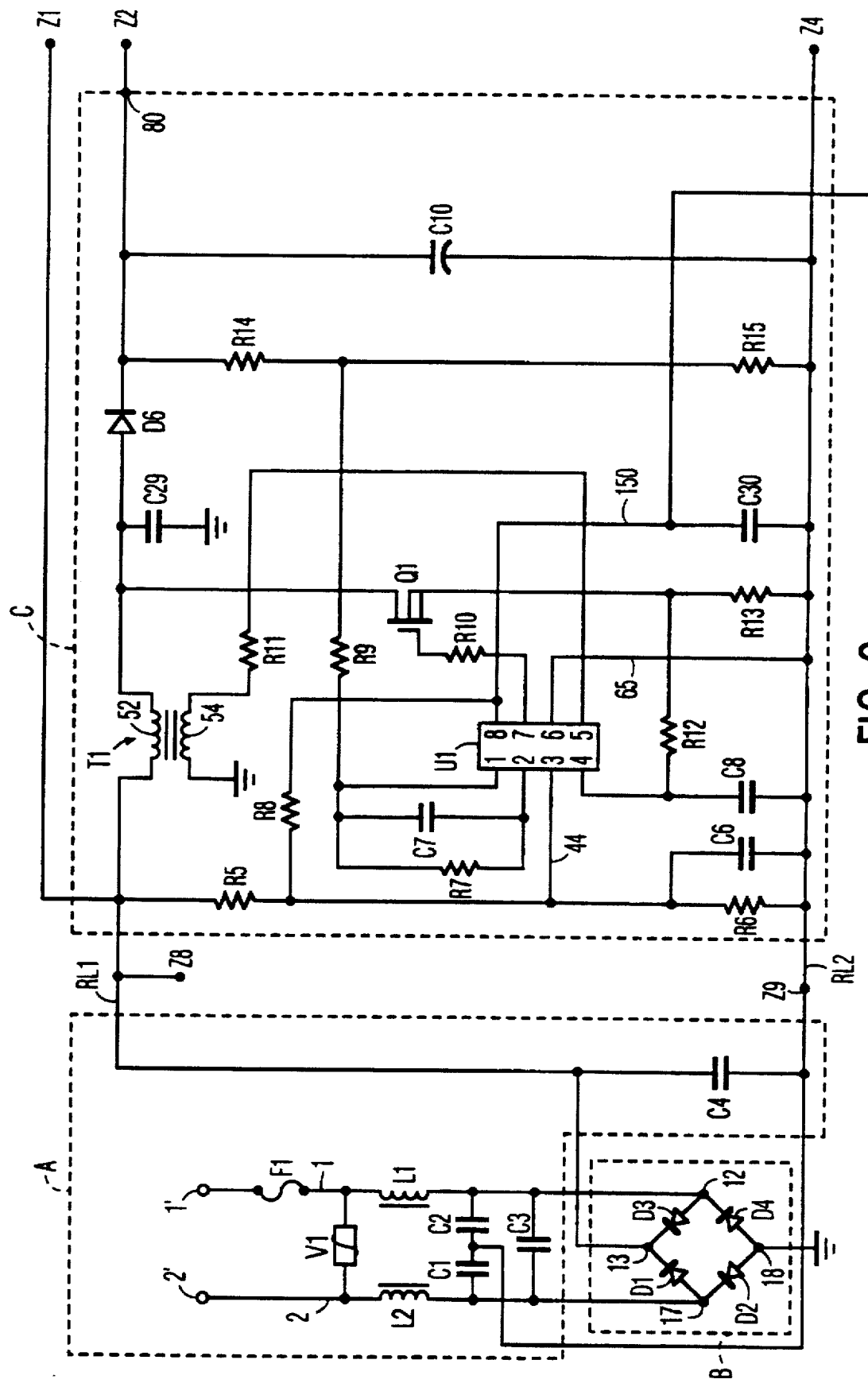
FIGS. 2(a)–2(c) show the detailed circuit diagram of the ballast of FIG. 1.

Filter Circuit A (FIG. 2(a)) includes a pair of input terminals 1', 2' for receiving an ordinary alternating current power line voltage, for example, of 120 volts AC. First and second choke coils L1, L2 each have a first end connected to a respective terminal 1',2' and a second end connected to a respective input node 12,17 of the full bridge rectifier B, consisting of diodes D1–D4, via input lines 1,2. A fuse F1 is in series between the choke coil L1 and input terminal 1'. A transient-surge-suppressing metal oxide varistor V1 bridges the lines 1,2. The varistor conducts little at line voltage but conducts readily at higher voltages to protect the ballast from high transient surge voltages. The rectifier provides a full wave rectified output voltage on a pair of DC rails RL1, RL2 via nodes 13, 18, respectively. The cathode of diode D2 and the anode of diode D1 are connected to line 2 at node 17 and the cathode of diode D4 and the anode of diode D3 are connected to line 1 at node 12. The anodes of diodes D2 and D4 are connected to DC rail RL2 at node 18 and the cathodes of diodes D1 and D3 are connected to the DC rail RL1 at node 13. For a 120 V, 60 Hz AC input at terminals 1',2' the bridge rectifier outputs a pulsed 120 Hz DC, 170 V peak across rails RL1, RL2. The output of the bridge rectifier may also carry phase control information from an external dimmer, to be further discussed.

Series capacitors C1 and C2, having their midpoint connected to ground, each have a relatively small capacitance and form a common mode filter which prevents very high frequency components from the ballast from entering the power line. The chokes L1, L2 and the capacitors C3, C4 form an EMI filter which has a low impedance at line frequencies and a high impedance at the much higher ballast operating frequency to reduce conduction of EMI back into the power lines. The operation of the EMI filter will be discussed in greater detail along with the interface and pre-conditioner circuits.

CIRCUIT C: Pre-Conditioner

Figure 3:
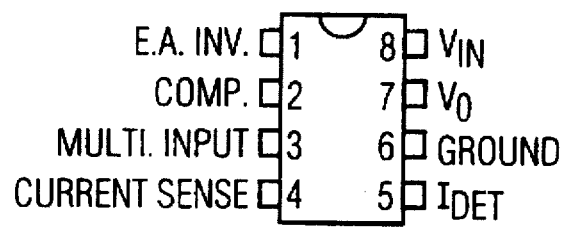
FIG. 3 illustrates the terminal pin arrangement for the IC U1 of the pre-conditioner circuit C.

The pre-conditioner circuit C (FIG. 2(a)) includes the primary components of an integrated circuit ("IC") control chip U1, in this instance a Linfinity LX1563, a boost inductor in the form of a transformer T1, a storage capacitor C10 and a boost switch Q1, which together form a switched mode power supply ("SMPS"). The controller U1 controls the switching of switch Q1 to (i) control the power factor of the current drawn from the power lines and (ii) increase the DC voltage across the capacitor C10, and rails RL1, RL2, to about 300 V DC. The pin connections for the IC U1, referred to below, are shown in FIG. 3.

Boost inductor T1 includes a primary coil 52 having one end connected to node 13 and another end connected to the anode of a diode D6. The cathode of the diode D6 is connected to an output 80 of the pre-conditioner circuit C. The anode of diode D6 is also connected to the drain of the mosfet switch Q1, the gate of which is connected to ground via a resistor R13. The control gate of switch Q1 is connected to the "OUT" pin (pin 7) of the IC U1 via a resistor R10. The OUT pin provides a pulse width modulated signal at the control gate of the boost switch to control the switching thereof. The multiplier input "MULT_IN" pin (pin 3) is connected to a node between the resistors R5 and R6 and senses the full wave rectified AC voltage on rail RL1, scaled by the voltage divider formed by the resistors R5, R6. The scaled voltage is one input of a multiplier stage within IC U1. The other input of the multiplier stage is internal and is the difference of an internal error amplifier output and an internal reference voltage. The output of the multiplier stage controls the peak inductor current in the primary of transformer T1 by influencing the timing of the switching of switch Q1. A capacitor C6 is in parallel with the resistor R6 and serves as a noise filter.

The "V$_{IN}$" pin (pin 8) receives the input supply voltage for the IC U1 from the output of the inverter circuit E via line 150. Since the output of the inverter is at high frequency, the bypass capacitor C30 provides a stable voltage supply. The "V$_{in}$" pin is also connected to a node between the resistors R5 and R6 via the resistor R8. This provides a small offset voltage to the MULT IN pin, which will be discussed in greater detail with reference to the EMI input filter. The secondary winding 54 of the booster choke T1 has one end connected to ground and its other end connected to the I$_{DET}$ pin (pin 5) via a resistor R11. The I$_{DET}$ pin senses the flyback voltage on the secondary winding 54 associated with the zero crossing of the inductor current through the primary winding 52. The GND pin (pin 6) is connected to ground via line 65 and rail RL2. The C.S. pin (pin 4) senses the current through the boost switch Q1 by sensing the voltage drop across the resistor R13 through the resistor R12. A filter capacitor C8, tied between the rail RL2 and the C.S. pin, filters any voltage spikes which may occur upon the switching of the switch Q1 from its non-conductive to its conductive state due to the drain-to-source capacitance of mosfet Q1. A second voltage divider including the resistors R14 and R15 is connected between the rails RL1 and RL2. The "INV" pin (pin 1) is connected to a node between the resistors R14 and R15 via a resistor R9 and senses the output voltage of the preconditioner stage. The "COMP" pin (pin 2) is connected to the output of the internal error amplifier within IC U4. A feedback compensation network consisting of a resistor R7 and a capacitor C7 connects the COMP pin to the INV pin, thereby providing internal feedback and further control of the switch Q1.

The full-wave rectified positive DC voltage from the output 13 of the input rectifier, which may also carry dimming control information from a remote dimming controller, enters the pre-conditioner circuit on rail RL1 to the voltage divider of resistors R5, R6 and to the booster choke T1. The DC component divides at lead 44 establishing a reference voltage to the multiplier input MULT_IN pin.

When the switch Q1 conducts, the resulting current through the primary winding 52 of transformer T1 and switch Q1 causes a voltage drop across the resistor R13 that is effectively applied through the resistor R12 to input C.S. This voltage at pin C.S. represents the peak inductor current and is compared with the voltage output by the internal multiplier stage, which multiplier output voltage is proportional to the product of the rectified AC line voltage and the output of the error amplifier internal to IC U1. When the peak inductor current sensed at pin C.S. exceeds the multiplier output voltage, the switch Q1 is turned off and stops conducting. The energy stored in the primary winding 52 is now transferred and stored in the boost capacitor C10, causing the current through the primary winding 52 to ramp down. When the primary winding 52 runs out of energy, the current through winding 52 reaches zero and the boost diode D6 stops conducting. At this point, the drain to source capacitance of the mosfet switch Q1 in combination with the primary winding 52 forms an LC tank circuit which causes the drain voltage on mosfet Q1 to resonate. This resonating voltage is sensed by the I$_{DET}$ pin through the secondary winding 54. When the resonating voltage swings negative, the IC U1 turns the switch Q1 ON, rendering it conductive. This conduction, non-conduction of switch Q1 occurs for the entire cycle of the rectified input and at a high frequency on the order of hundreds of times the frequency of the AC voltage entering the input rectifier. The inductor current through winding 52 has a high frequency content which is filtered by the input capacitor C4, resulting in a sine wave input current in phase with the AC line voltage. Essentially, the pre-conditioner stage makes the ballast look resistive to the power lines to maintain a high power factor.

For a 120 V AC input, without phase cutting, the voltage at output 80, the positive side of buffer capacitor C10, is on the order of 300 V DC with a small alternating DC component present. It is this voltage which is supplied to the ballast stage D, and in particular, to the inverter E. Output voltage regulation is accomplished by the sensing of the scaled output voltage, from the divider formed by the resistors R14, R15, by the internal error amplifier at the INV pin. The internal error amplifier compares the scaled output voltage to an internal reference voltage, and generates an error voltage. This error voltage controls the amplitude of the multiplier output, which adjusts the peak inductor current in winding 52 to be proportional to load and line variations, thereby maintaining a well regulated output voltage for the inverter circuit E.

Additional information about the LX1563 IC is available from Linfinity, Inc. of Garden Grove, Calif. 92641. It should be noted that other power factor control IC's are commercially available which provide substantially similar power factor control and voltage supply functions.

CIRCUIT E: Inverter

Figure 2B:
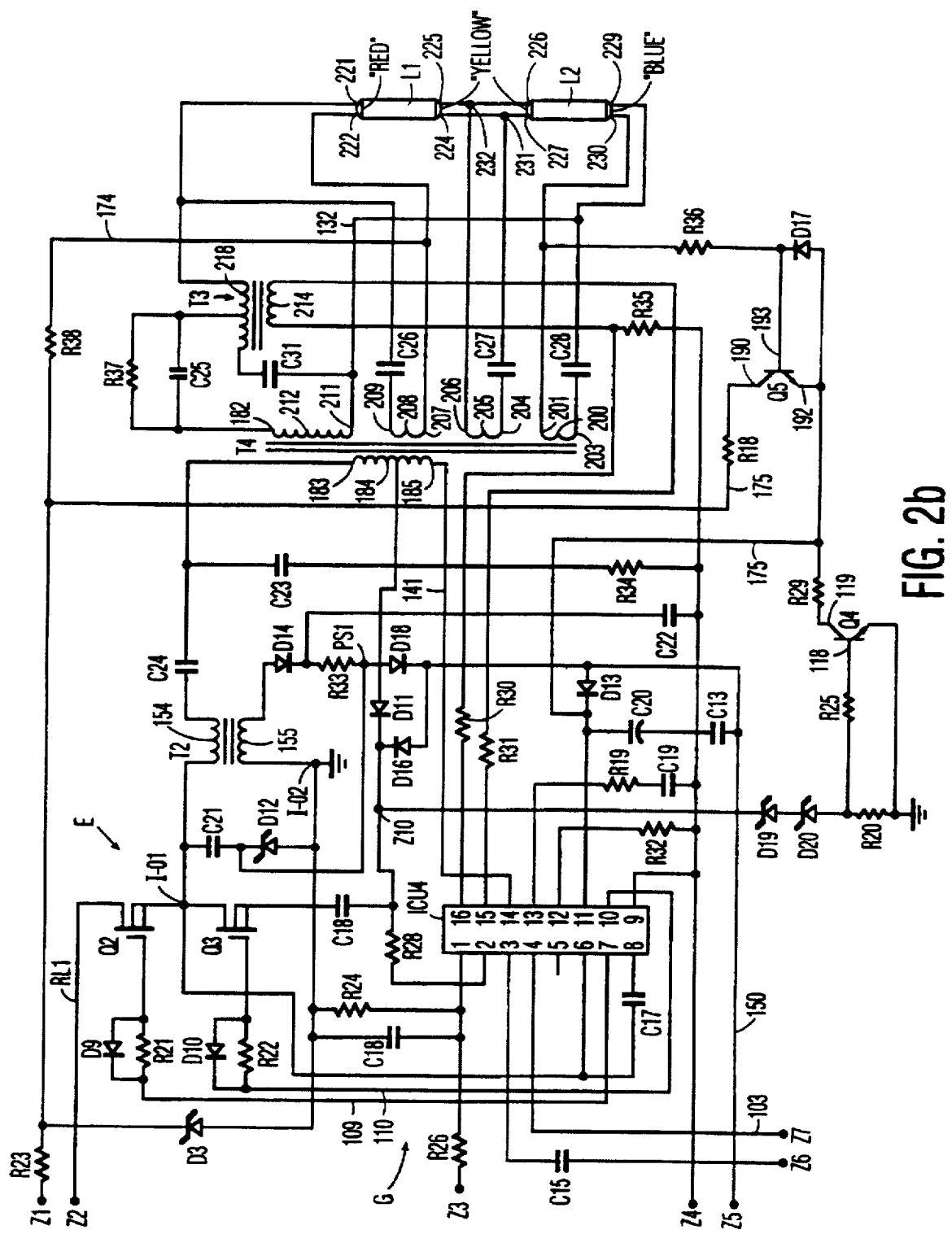

The inverter (FIG. 2(b)) includes a pair of switches Q2 and Q3 which are arranged in a half-bridge configuration and convert the DC voltage from the pre-conditioner circuit to a high frequency substantially square wave AC output signal across the inverter outputs I01 and I02, under the control of control circuit G.

The switches Q2 and Q3 are mosfets. The drain of switch Q2 is connected via the rail RL1 to output 80 from the pre-conditioner circuit. The source of the switch Q2 is connected to the drain of the switch Q3. The control gate of the switch Q2 is connected via control line 109 to a respective gate controller terminal G1 (pin 7) of controller U4 of the control circuit via a parallel arrangement of a resistor R21 and a diode D9. The anode of the diode D9 is connected to the control gate of the switch Q2. The diode D9 and resistor R21 provide rapid evacuation of charges from the control gate to enhance switching speed. The control gate of the switch Q3 is similarly connected to gate control terminal G2 (pin 10) of IC U4 through line 110 via a similar parallel arrangement of a diode D10 and a resistor R22. Line 111 connects the midpoint I01 between the source of the switch Q2 and the drain of the switch Q3 to the controller circuit G and to one end of the capacitor C21.

CIRCUIT G: Inverter Controller Circuit

Figure 4:
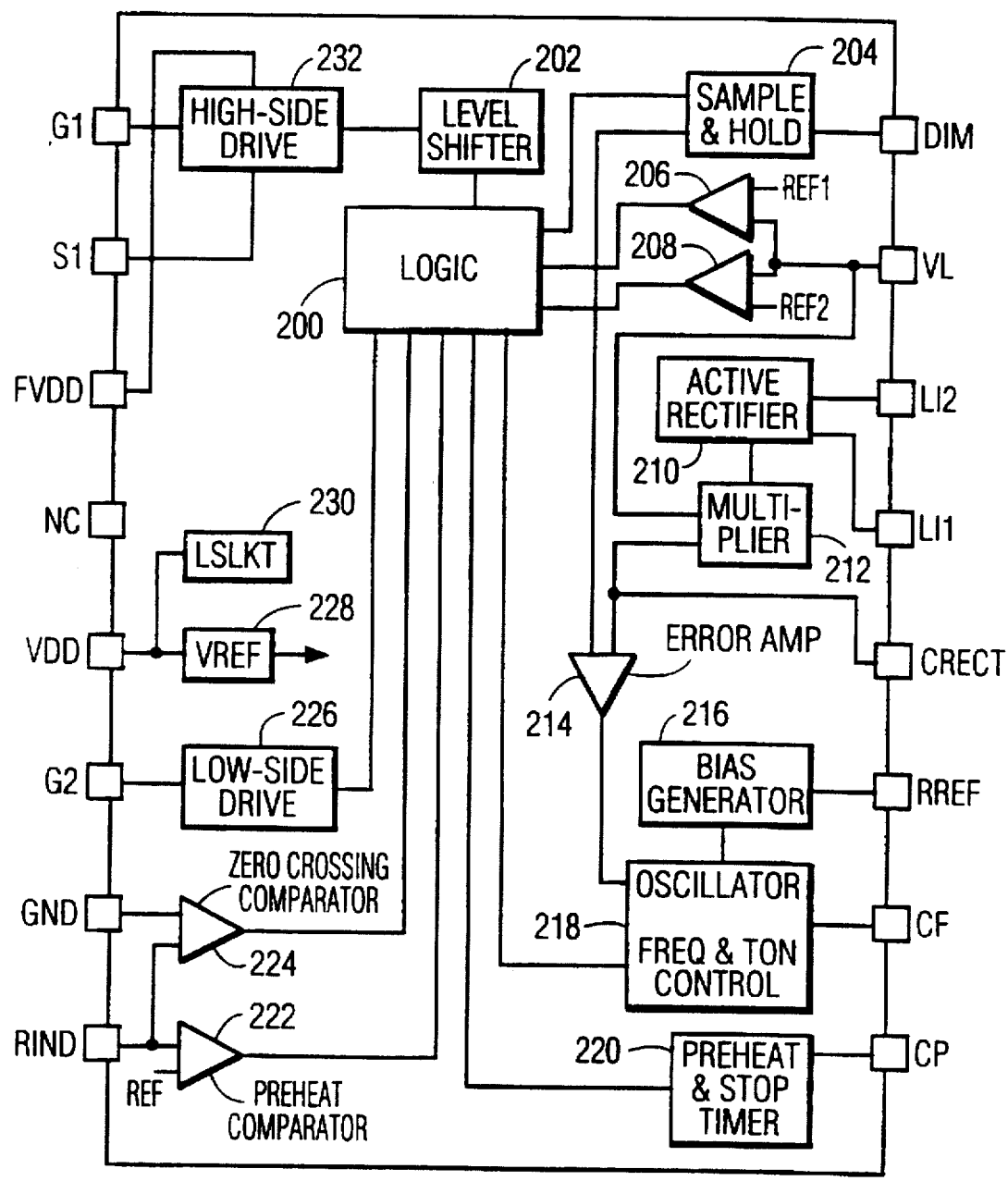
FIG. 4 is a block diagram of the IC U4 of circuit D.

The controller circuit G (FIG. 2(b)) controls the operation of the half-bridge inverter. The heart of the controller circuit is a 16 pin microcontroller U4, whose block diagram is shown in FIG. 4.

The IC U4 contains a half-bridge driver for switches Q2 and Q3 as well as control circuits for preheat, ignition, on-state, dimming and protection. Dimming is achieved through closed loop control of a feedback sense of current and voltage down to 10% light level through the use of a semi-triangular oscillator used to implement forward conductance control. The various control circuits of IC U4, shown in FIG. 4 and identified with reference numerals 200–232, will be referred to in the following description of pin connections and in the discussion of half-bridge operation. The actual pin arrangement employed in the IC U4 of FIG. 2(b) is illustrated in FIG. 5.

Figure 2C:
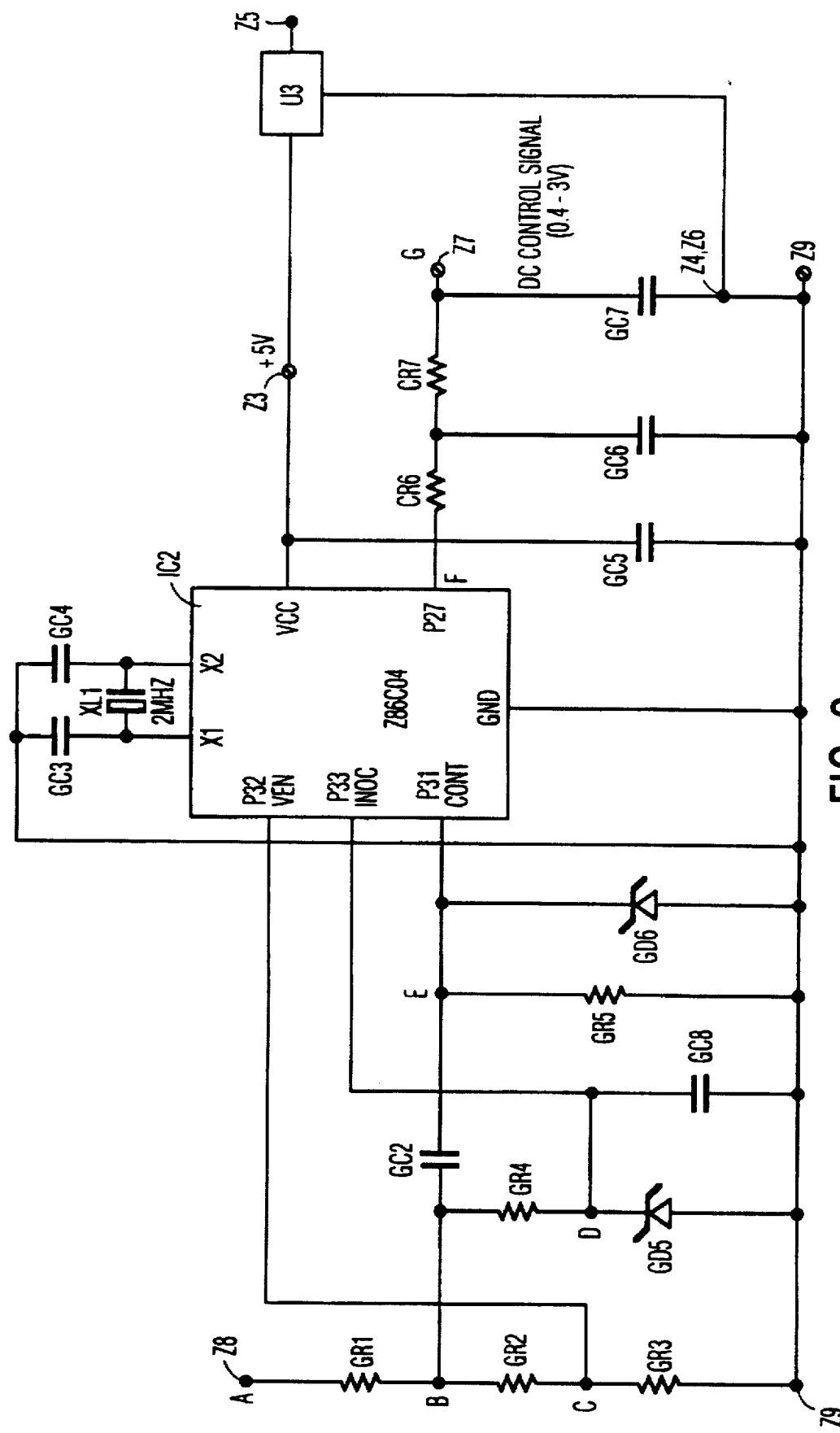

Pin 1 (CRECT) is connected to a 5 V DC output of the voltage regulator U3 (FIG. 2(c)) via the resistor R26. The CRECT pin is connected to the output of multiplier 212 and provides a current that represents the lamp power into the CRECT capacitor C16 and RRECT resistor R24. The resistor R24 sets the gain of the multiplier 212 while the capacitor C16 filters the high frequency ripple in the CRECT output current and also determines the time from lamp ignition until full lamp power regulation. Pin 2 (VL) senses an averaged lamp voltage, via its connection to a tap on the primary winding 184 of transformer T4 of the output circuit F through a series connection of a resistor R28 and a diode D31, which is input to the multiplier 212 and error amps 206, 208. Pin 3 (CP) is connected to a timing capacitor C15, which sets the preheat time and stop timing duration of the preheat and stop timer 220. Pin 4 (DIM) receives a dimming control signal via line 103 from the dimming interface circuit, which dimming signal is applied the sample and hold circuit 204. Pin 5 remains unconnected. Line 111, which extends from junction I01 between the switches Q2 and Q3, is connected directly to pin 6(SI) and is connected to pin 8 (FVDD) via a bootstrap capacitor C17. Pin SI is a floating source pin for the high side driver 232 of switch Q2 while pin FVDD is the supply voltage pin for high side driver 232. The bootstrap capacitor C17 is charged by an on-chip diode during each time that switch Q3 is in the conducting state. Line 109, which is connected to the control gate of the switch Q2 via the parallel arrangement of resistor R21 and diode D9, is connected to pin 7(G1) the output of the high side driver 232.

Pin 9(GND) is connected to ground (rail RL2). Pin 10 (G2), the output of the low side driver 226, is connected to line 110, which is connected to the control gate of the switch Q3 via the parallel arrangement of the diode D10 and the resistor R22. Pin 11 (VDD) is the power supply input for IC U4 and is the voltage supply for the low side (ground level control) of the inverter. Pin 11 is connected to line 175 from the safety circuit H (to be further described) and to the high side of the VDD supply capacitor C20. Pin 13(CF) is connected to the rail RL2 through the series connected capacitor C19 and a resistor R19, which set the forward conduction "FWD" time of switch Q2, Q3 output by the oscillator and frequency control circuit 218. The capacitor C19 also sets the frequency of oscillation of the inverter. Pin 14(RIND) monitors inductor current through its connection to the end 185 of the primary winding 184 of transformer T4 via a line 141. Pin 15(LI1) is connected to one side of a sense resistor R35 through a first input resistor R31, and pin 16 (LI2) is connected to the other end of sense resistor R35 through the identical resistor R30. Pins LI1 and LI2 sense differences in lamp current between the lamps L1 and L2, for the active rectifier 210, by means of the sense resistor R35 to which a bias current is applied by the secondary winding 214 of transformer T3.

CIRCUIT F: Resonant Tank Output

The output circuit (FIG. 2(b)) provides a proper output voltage and current to the fluorescent lamps L1 and L2. The output circuit also provides filament heating for lamp ignition.

The output circuit has a first pair of output terminals 221, 222 for connection to a first pair of lamp contacts between which extends a first (hereinafter "red") filament of the lamp L1, a second pair of outputs terminals 234, 232 for connection to a respective pair of lamp contacts 224, 225 and 226, 227 on each of lamps L1 and L2 between which a second and third (hereinafter the "yellow") filaments extend, and a third pair of output terminals 231, 230 for connection to a respective pair of lamp contacts between which a fourth (hereinafter the "blue") lamp filament extends.

The output circuit includes an LCCR type resonant tank formed by the primary winding 154 of transformer T2, the DC blocking capacitor C24, the capacitor C23 and the lamp impedance reflected at the primary winding 184 of isolation transformer T4. The capacitor C24 blocks DC components of the inverter output voltage generated at node I01. Prior to ignition, the lamp impedance is very high so the Q curve is set primarily by the inductance of winding 154 and the capacitance of the capacitor C23. After ignition, the impedance of the lamps reflected at winding 184 of transformer T4 shifts the Q curve in the well-known manner.

The first ends of the first 154 and second 155 windings of the transformer T2 are connected via a series arrangement of a zener diode D12 and a capacitor C21. The diode D12 and capacitor C21 form a so called dv/dt supply, and along with the zener diode D14 and the resistor R33 connected to the second end of the winding 155, a dual voltage supply at the node PS1 when the inverter is oscillating. A node between the cathode of the diode D14 and the resistor R33 is connected to ground (rail RL2) via a capacitor C22.

An iron core transformer T4 includes a primary winding 184 having one end 183 connected to the DC blocking capacitor C24. The other end 185 of winding 184 is connected directly to the RIND pin of IC U4 by line 141. A suitable voltage for igniting and operating the lamps L1 and L2 is provided by the secondary winding 212 of the transformer T4, which has one end 211 connected to the lamp contact terminal 229 via line 132 and its other end 182 connected to the lamp connection terminal 221 through a parallel arrangement of a resistor R37 and a capacitor C25, which arrangement is connected at a tap of a winding 218 of the transformer T3. The secondary winding 214 of transformer T3 provides a bias current for a sense resistor R35, which senses differences in lamp current between lamp L1 and L2.

Filament windings 200, 205 and 208 provide a current through the blue, yellow and red filaments, respectively, for filament heating. Filament winding 208 has one end 207 connected to the output terminal 222 and its other end 209 connected to output terminal 221 and to the end 219 of primary winding 218 of transformer T3 via a capacitor C26. Output terminal 232 is connected directly to one end 206 of the filament winding 205 and output terminal 231 is connected to the other end 204 of winding 205 via a capacitor C27. Output terminal 230 is connected to one end 201 of filament winding 200, the other end 203 of which is connected to output terminal 229 and the other end 211 of secondary winding 212 via a capacitor C28. The capacitors C26, C27, C28 serve to regulate changes in filament heating voltage, provide some impedance if the leads of filament windings are shorted, and aid the function of the safety circuit as will be further described.

CIRCUIT H: Safety

The safety circuit H of FIG. 1 includes a stop circuit for stopping the oscillation of the half-bridge of the AC-DC converter in the event that one or both of the lamps is removed from the lamp contact terminals to prevent the presence of a dangerous voltage level at the lamp contact terminals. This is a back-up safety function in the event that the primary stop function provided by IC U4 fails to shut down inverter oscillation. The safety circuit H also includes a restart circuit for sensing when a lamp having two intact filaments has been inserted in place of a defective lamp and for restarting the IC U4 so as to operate the two fluorescent lamps.

Figure 6:
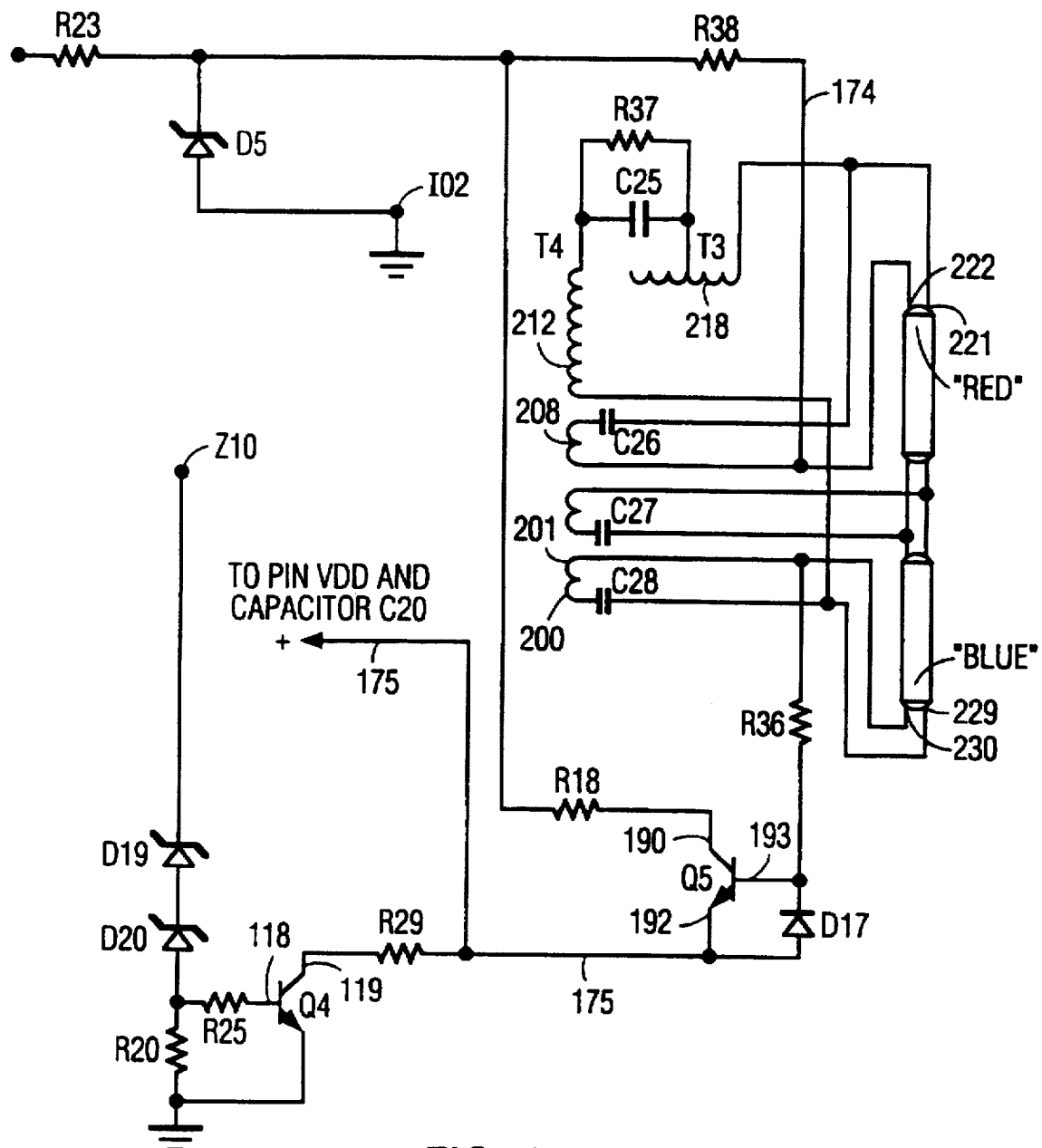
FIG. 6 is an isolated circuit diagram of the safety/start/restart circuit H.

The safety circuit included in FIG. 2(b) is shown isolated in FIG. 6 and includes switches Q4 and Q5, which are bipolar NPN transistors. The base 193 of the switch Q5 is connected to a junction between the end 201 of filament winding 200 and output terminal 230 via a resistor R36. The collector 190 of switch Q5 is connected through the resistor R18 to a junction between the resistors R38 and R23. A diode D17 has its cathode connected to the base 193 and its anode connected to the emitter 192 of the switch Q5. The emitter 192 is also connected via line 175 directly to pin VDD, the power supply pin for the microcontroller IC-U4 and the ground level of the inverter. The resistor R29 is connected between the emitter 192 of switch Q5 and the collector 119 of switch Q4. The base 118 of transistor Q4 is connected to one end of a resistor R25, the other end of which is connected to a node between one end of the resistor R20 and the series connected zener diodes D19 and D20. Zener diode D20 is connected to node Z10 in the line which senses lamp voltage.

Ballast Operation Without Dimming Control

When the ballast is turned ON, i.e. the power line voltage is applied to the input terminals 1', 2', a 120 Hz, 170 V peak fully rectified DC voltage is present at the outputs 13, 18 of the full bridge rectifier. (FIG. 2(a))

When two good lamps are present (i.e. both filaments in each lamp are intact), the IC U4 is supplied with power in the following manner. Current flows through the resistor R23 from the DC rail RL1. The zener diode D8 clamps the voltage at +25 V DC which is applied to the resistor R38, which causes a DC current to flow from line 174 through the red filament (in the direction from lamp connection terminal 222 to 221), through the winding 218 of the transformer T3, the resistor R37 and winding 212 of the transformer T4 and then through the blue filament (in the direction from lamp connection terminal 229 to 230). Current then flows through the resistor R36 to the base of transistor switch Q5, causing switch Q5 to conduct. The VDD supply capacitor C20 is then charged through the resistor R18 and line 176 so that a voltage is present at pin VDD which turns the controller U4 ON. After the inverter begins oscillating, discussed hereafter, the supply capacitor C20 remains charged through diodes D18 and D13 from the voltage supply at node PS1, previously discussed. (FIG. 2(b))

Initial Startup

Figure 7:
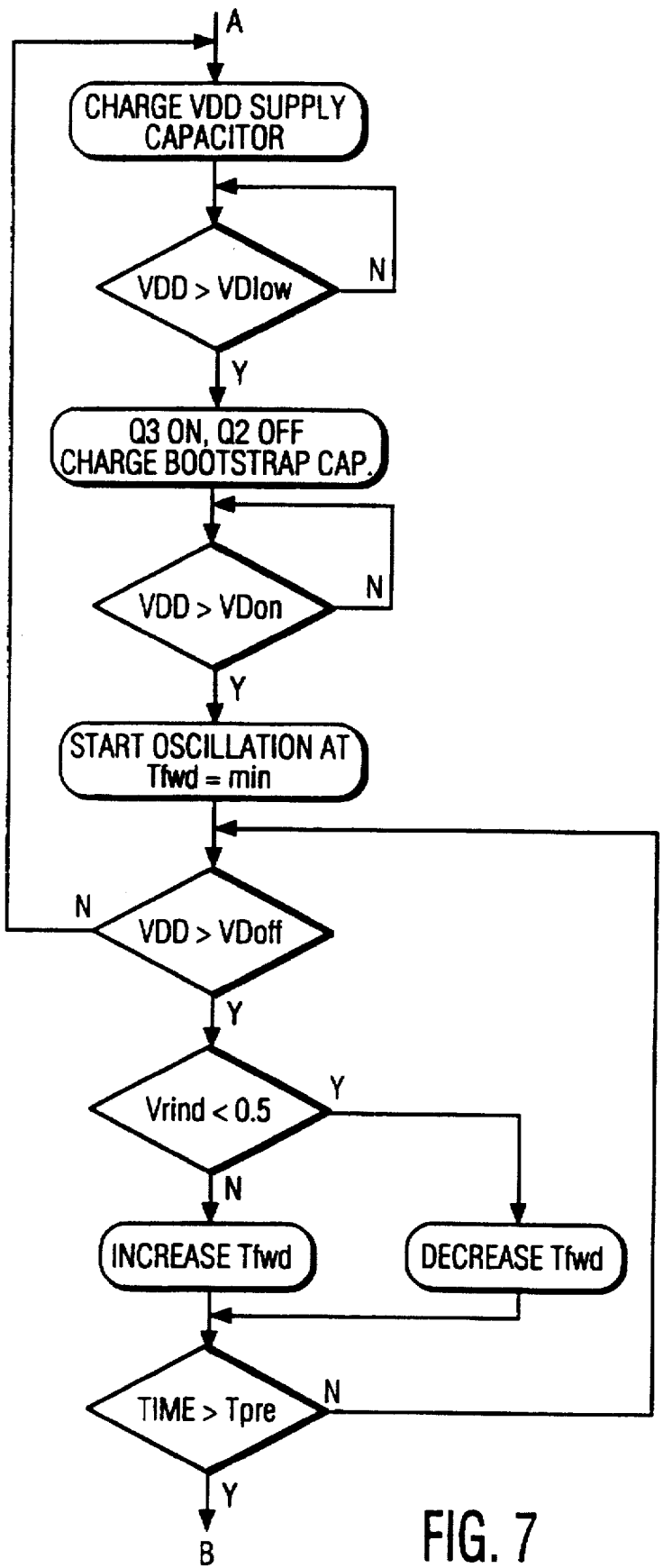
FIG. 7 is flow chart of the start-up and pre-heat stages for the controller U4.

A flow chart illustrating the start-up of IC U4 and of the preheat phase is shown in FIG. 7. Throughout the initial charging of VDD supply capacitor C20, which occurs for a voltage at pin VDD in the range of 0V to a voltage "VDon" of about 12 V, the IC U4 is defined to be in a "startup" state. During the startup state, the IC U4 is in a non-oscillating condition and simultaneous conduction of Q2 and Q3 is prevented throughout this phase.

For the voltage at the VDD pin exceeding a level "VDlow" of about 6 V, switch Q3 will be on and switch Q2 will be off to ensure that the bootstrap capacitor C17 is charged through the internal bootstrap diode to a voltage level near VDD at the end of the initial charging phase. Also, the capacitor C19 tied to pin CF is charged to a level of "Vreg" of about 5 V at the end of the startup phase.

Oscillation

Once the supply capacitor C20 is charged to a value above Vdon, the IC U4 switches into the preheat state, and oscillation commences. The oscillator 218 via the logic circuit 200, level shifter 202, and the high 232 and low 226 side drives alternately switches transistors Q2 and Q3 into conduction with an identical forward conductance time FWD. (FIG. 9(a)) The duration of non-overlap between conductance of Q2 and Q3 (non-overlap time) is fixed at about 1.4 μs by the reference resistor R32. The oscillator normally operates in the forward conductance mode of control by implementing a semi-triangular voltage waveform "VCF" at the CF pin.

Figure 11A:
FIGS. 11(a)–11(d) show voltage waveforms on the gates of switches Q2 and Q3, the half-bridge node, and at the RIND pin of controller U4, respectively.
Figure 11B:
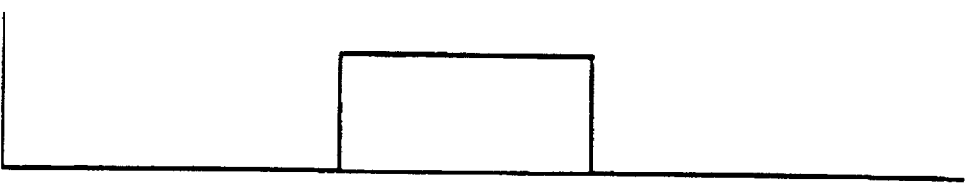
Figure 11C:

Given an inductive mode of operation of the half-bridge, the flat portion of the VCF waveform corresponds to body diode conduction (of the mosfets Q2, Q3) whereas the sloped portions coincide with actual transistor (forward) conduction. Forward conduction cannot start before the end of the non-overlap time. The duration of the sloped portions is the previously referred to "FWD" time. Moreover, the rising slope coincides with the forward conductance of the top half-bridge switch Q2 and the falling slope with the forward conductance of the bottom half-bridge switch Q3. The end of the body diode conduction is detected by a zero crossing at the RIND pin. The resulting semi-square wave half-bridge voltage VHB (See FIG. 11(c)) at half-bridge output I01 at pin S1 is then used to drive the resonant tank output circuit F.

Starting Oscillation

Once the supply capacitor C20 is charged above VDon, the oscillation begins by discharging the CF capacitor C19 which had been charged to Vreg during the startup phase. When the voltage at pin CF reaches a first level "VCF1" of about 1V, switch Q3 is turned off, and the non-overlap timing is started. Following the non-overlap duration, switch Q2 is brought into the conducting state and the CF capacitor C19 simultaneously begins charging. Normally, the CF capacitor C19 begins charging only when a zero crossing is detected at the RIND pin. However, there is no guarantee that a zero crossing can be detected in the first switching cycle due to offsets in the comparator 224, so a non-overlap timer within circuit 218 is used to start the first FWD charging period at the CF pin. Following this first cycle, the RIND function works in the normal fashion.

Once oscillation begins, the same voltage present at supply node PS1 which charges the supply capacitor C20, is provided via line 150 to the VDD pin of the IC U1 and the pre-conditioner circuit commences operating in the manner previously described.

Forward Conductance Time Sweep and Preheat Control

Figure 10A:
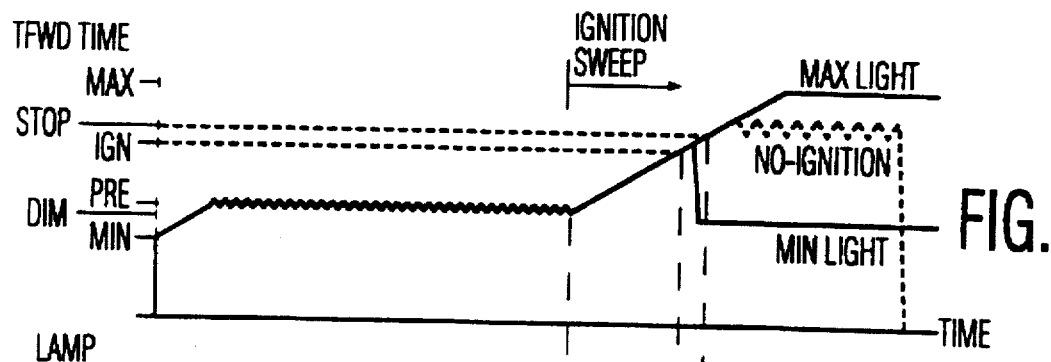
FIGS. 10(a)–10(d) illustrate waveforms for the pre-heat and ignition sequence.

The IC U4 starts oscillation with the minimum FWD time and gradually increase this time at a controlled rate equal to "SWPdwn" (see FIG. 10(a)). During the pre-heat stage, the preheat comparator 222 compares the voltage of pin RIND, resulting from the inductor current through the primary 184 of transformer T4, with a preheat threshold reference voltage "Vpre" of about −0.5 V. If the voltage sensed at the RIND pin is below Vpre at the time Q3 is switched off, the increase in FWD time stops and is then followed by a decrease in FWD time. This results in a regulated inductor current through the primary coil 184 of transformer T4, and consequently a regulated lamp electrode current, for the duration of the preheat cycle. In the present embodiment, the rate of decrease in frequency (or 1/FWD), "SWPdwn", is 0.017% per cycle; the rate of increase in frequency (or 1/FWD), SWPup, is equal to 3 times SWPdwn, both at a typical inverter frequency of 85 KHz during preheat (FWD time equal to 2.94 μs). The rate of increase and decrease in FWD time is fixed by an internal switched capacitor circuit within IC U4 which maintain a constant ratio independent of FWD time. The slope of the change in FWD time is also a fixed on-chip solution and cannot be changed externally.

Preheat time

Figure 10B:
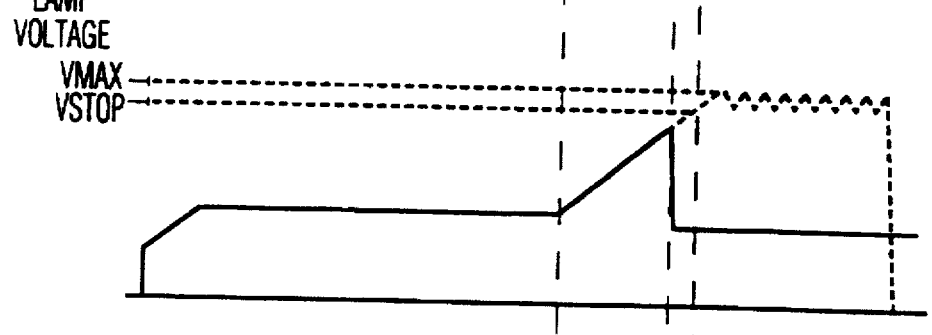
Figure 10C:
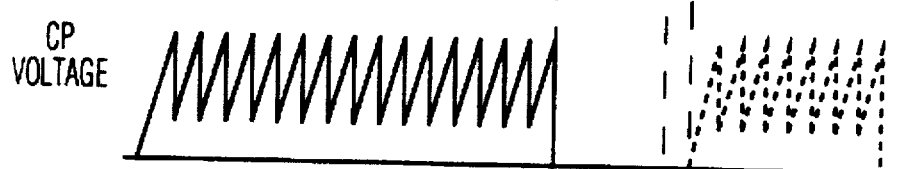
Figure 10D:
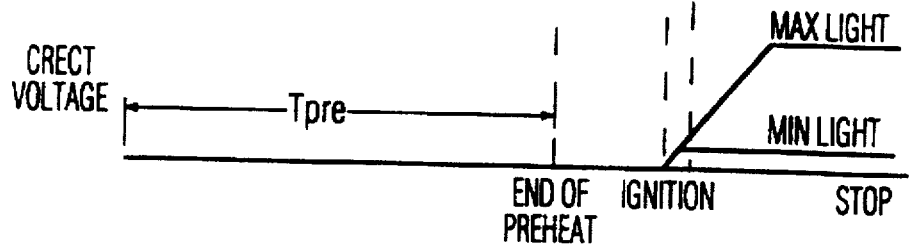

The preheat cycle begins at the instant oscillation starts and its duration, "Tpre", is determined by the capacitor C15 tied to the CP pin and the reference current set by the resistor R32 tied to pin Rref. In the current embodiment, Tpre is set at about 0.9 seconds. (FIG. 10(d))

FWD Sweep to Ignition

Figure 8:
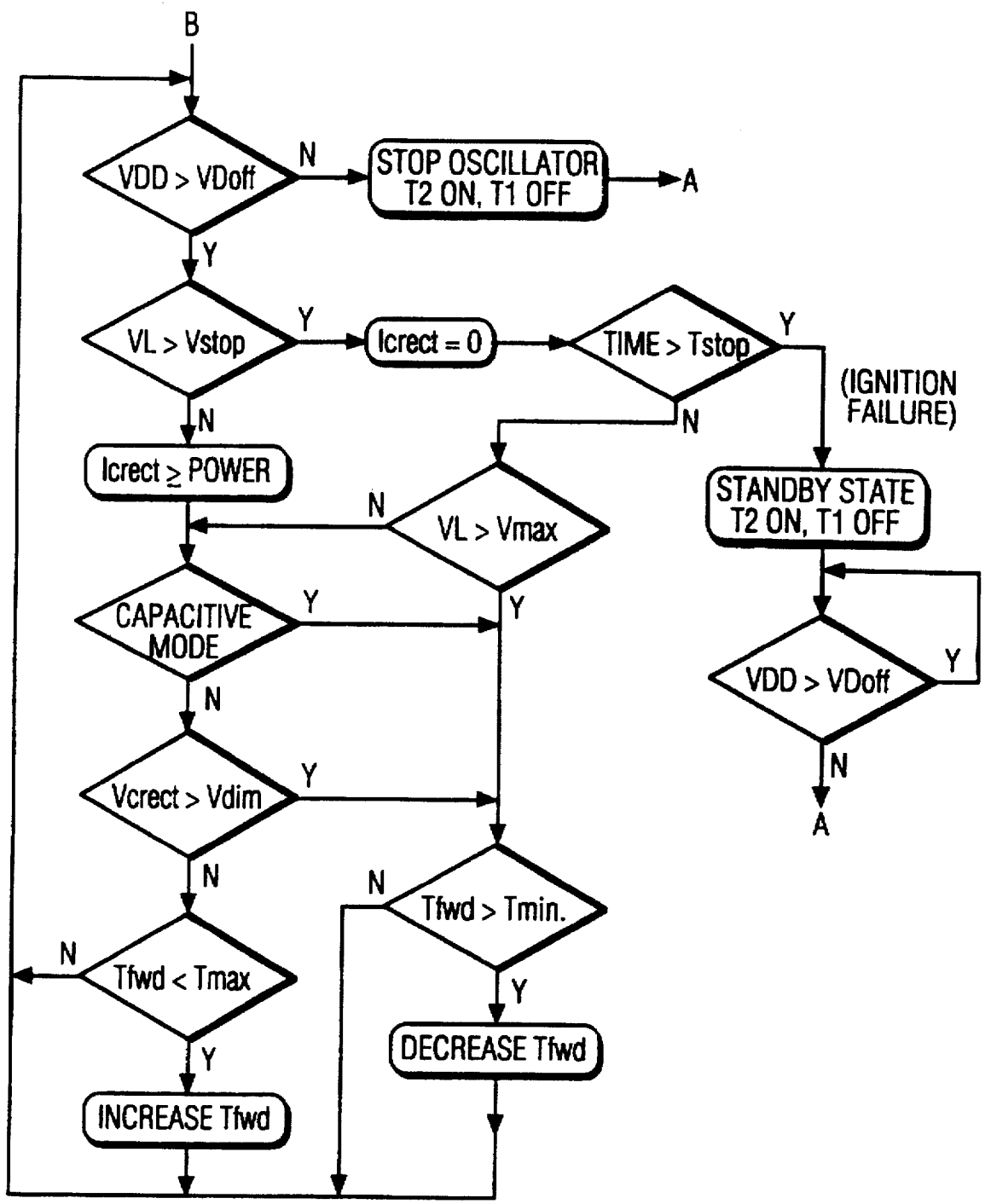
FIG. 8 is a flow chart for the ignition and normal operation stages of the controller U4.

The flow chart for ignition and normal operation is illustrated in FIG. 8. After the preheat time is over, the FWD time increases further, now without regard to the Vpre level at pin RIND. (See FIG. 10(a)) The rate of decrease in frequency (or 1/FWD) is equal to SWPdwn. During this upward sweep in FWD time the circuit approaches the resonance frequency of the load. Consequently, a high voltage appears across the lamp which normally results in lamp ignition. (FIG. 10(b))

Failure to Ignite

Failure of the lamp to ignite will be detected by sensing the rectified open circuit lamp voltage at pin VL. An averaged representation of the rectified lamp voltage, in the current embodiment from a tap on the primary 184, is fed as a current signal into Pin VL.

The logic circuit 200 includes a STOP function which is available at the instant ignition sweep starts and is present during normal operation. If the current into pin VL exceeds a level corresponding to a lamp voltage of Vstop, at the time Q3 is switched off, then the stop timing circuit 220 is activated and the output current from the CRECT pin is made zero. The stop timing duration, "Tstop", is set by the capacitor C15 tied to the CP pin and may be equal, for example, to about half of the preheat time. If the open circuit lamp voltage falls below Vstop before Tstop is exceeded, again at the time Q3 is switched off, then the lamp is considered to have ignited, the stop timing counter 220 is reset, and the multiplier 212 acts normally, feeding a current proportional to the product of lamp voltage and current into the CRECT pin. However, if the stop timing duration is completed, the lamp is considered to have not ignited. At the next conductance cycle for Q3, the half-bridge will be put into the non-oscillating or standby state. Only one ignition attempt is made. The Vstop level is chosen to be just above (+10%) the maximum lamp voltage under dimming conditions, which occurs at the lowest light setting. In the current implementation, Tstop, Vstop, and Vmax have been selected as ½ sec, 450V, and 900V, respectively.

If the current into pin VL exceeds a second defined level corresponding to an open circuit lamp voltage of Vmax, at the time Q3 is switched off and before time Tstop is exceeded, then the upward sweep in FWD time is stopped and is followed by a decrease in FWD time. When the open circuit lamp voltage drops below Vmax the downward sweep stops and is followed by an increase in FWD time. The rates of increase and decrease in frequency (or 1/FWD) are equal to SWPup and SWPdwn, respectively. This mode of dynamic lamp voltage regulation continues until the lamp ignites or the time Tstop is exceeded.

Standby State

The standby state is characterized by Q2 being off and Q3 being on, and the voltage at pin VDD being greater than VDoff. This state is exited by powering down the IC U4 (by removing the mains supply at input terminals 1',2'), and powering back up to above VDon. The standby state is also exited by the restart function of the safety circuit.

Normal Operation

After a normal ignition, the FWD time continues to increase at a rate equal to SWPdwn. However, since the lamp has ignited there is a large increase in lamp power which is detected by the lamp current and voltage sensing pins (L1 and VL), and converted into an output current at the CRECT pin which is proportional to the averaged lamp power. Consequently, the capacitor C16 tied to CRECT will start to charge from its initial value of zero volts up to a value equal to that at the DIM pin. The voltage at the DIM pin will be described in greater detail hereafter with reference to the dimming interface circuit. Once the voltages at pins CRECT and DIM are equal, the error amp 214 and the oscillator control 218 maintains their equality (thereby regulating the lamp power) by constantly adjusting the FWD time.

The delay from the moment of ignition to the time the lamp power reaches its regulated value is determined primarily by the charging time of the CRECT capacitor C16. With the dim level set at 100% light output, the FWD time continues to increase (at the rate SWPdwn) until the voltage at CRECT reaches its maximum value of 3V and the feedback loop closes. (See FIGS. 10(a), 10(b)). With the dim level set at its minimum level, the CRECT capacitor only has to charge to about 0.3 volts before the feedback loop closes and drives the FWD time back down almost instantaneously to reduce the light level. As a result, the duration of the high light condition following ignition is very short for low dim settings, and the visual impact of the undesirable "light flash" is minimized.

Dimming

Dimming of the lamp is accomplished through the closed loop control of the average lamp power. The voltage at the CRECT pin, representing the average lamp power, is compared to the dimming reference voltage applied at the DIM pin. An internal high gain error amplifier 214 drives the FWD time of oscillator 218 until the difference between these two inputs is reduced to near zero, resulting in a linear and proportional control of the lamp power with the DIM voltage. The waveform at the DIM pin is internally sampled by the sample and hold register 204 during the last fourth of the falling sloped portion of the VCO waveform, and held just prior to the falling edge of the Q3 gate drive signal. The useful input range at the DIM pin for dimming control is between a maximum level of 3V, and a minimum level of 0.3V. Voltages greater than 3V have the same effect as the maximum, and voltages less than 0.3V are equivalent to the minimum. The lamp control loop is only closed following a successful lamp ignition. External changes in the DIM control voltage are set to be slower than the rate of change in voltage at the CRECT pin (set by the RRECT resistor R24 and CRECT capacitor C16).

Lamp Current Rectification

The active rectifier 210 (FIG. 4(a)) provides a full-wave rectified representation of the AC lamp current waveform for use in regulating the lamp power. It consists of a bipolar current amplifier, whose inputs are formed by pins L11 and L12, and an external resistor network including the sense resistor R35, and a pair of identical input resistors, R30 and R31. The AC lamp current is converted by this resistor network into a differential current, ILdiff, at pins LI1 and LI2. The output of the amplifier 210 feeds a current, which is equal to the absolute value of the differential input current, to one of the inputs of the multiplier circuit 212. Very low lamp current levels are accurately rectified and controlled by employing such an active circuit for the rectifier function.

The rectifier function operates in the following way. An AC lamp current flowing through the sense resistor R35 results in a proportional AC voltage across its terminals. Each end of the resistor R35 is connected through a respective input resistor, R30, R31, to one of the two input pins LI1, LI2. These pins act as current sources that maintain a zero difference voltage between the pins, and a common mode voltage given by:

$$Vli1=Vli2=\max(V1, V2)+R31*ILbias$$

where V1 and V2 are the voltages of the two ends of the sense resistor R35 and Ilbias is a bias current provided by the transformer T3.

With zero lamp current there is no voltage across R35 and consequently no difference in voltage between the two resistors R30 and R31. Consequently, the resistors R30, R31 will have identical voltage drops equal to R30*ILbias and R31*ILbias. When a lamp current is present, the voltage induced across R35 is also dropped across one of the resistors R30, R31 such that the current through it increases (by ILdiff) while the current through the other one remains at a constant value of ILbias. The output current from the active rectifier 210 is approximately equal to the absolute value of the differential input current which is given by:

$$ILdiff=Ilamp * R35/R31$$

Lamp Power Regulation

An on-chip multiplier 212 (FIG. 4(a)) generates the product of lamp voltage and current during normal closed loop operation. The averaged representation of the rectified lamp voltage is fed as a current signal into pin VL where it is applied to one input of the multiplier 212. A second input to the multiplier 212 is obtained from the output of the active rectifier 212. The product of the lamp voltage and lamp current is available as an output current at pin CRECT, where it is injected into the parallel network consisting of the RRECT resistor R24 and CRECT capacitor C16. The voltage at the CRECT pin provides a filtered representation of the average lamp power. CRECT capacitor C16 is also used to stabilize the feedback control loop. In a typical application circuit, the 3 to 0.3 V control range set by the DIM function results in an equivalent variation in the CRECT voltage (for a linear resistor at CRECT), and consequently in a lamp power range of 10:1 with a minimum light level of 10%.

Capacitive-Mode Protection

Figure 11D:
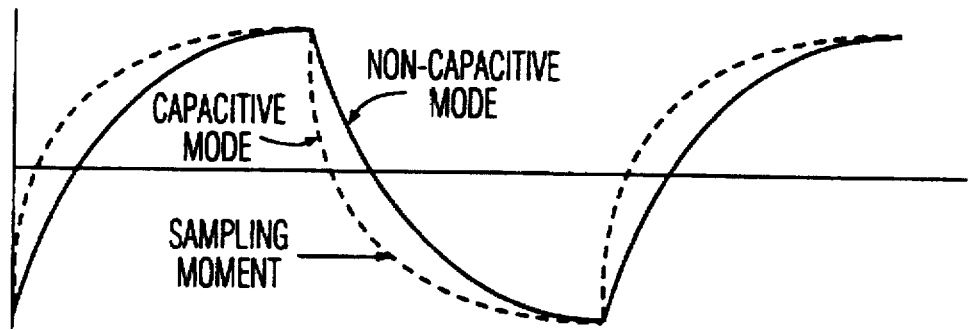

The IC U4 protects the inverter and output circuits against getting too close to a capacitive mode of operation. The voltage across the shunt resistor R34 is monitored by means of pin RIND. The state of the RIND pin is sampled at the start of conduction of either switch Q2 or Q3, and by checking the polarity of the signal a determination is made if the body diode of the respective switch is conducting. If the voltage at pin RIND is negative at the moment that switch Q3 is switched into conduction, then the body diode in Q3 has stopped conducting and the circuit is assumed to be close to or in capacitive mode. (FIG. 11(d)) Similarly, if the voltage at pin RIND is positive at the moment that Q2 is switched into conduction, the circuit is again assumed to be close to or in capacitive mode. Consequently, the logic circuit 200 will cause the oscillator and control circuit 218 to increase the frequency (or 1/FWD) a rate of SWPup for as long as capacitive mode is detected, and decrease at a rate of SWPdwn down to the regulated 1/FWD frequency if capacitive mode is no longer detected.

If a lamp is removed or fails after normal operation has commenced, the change of impedance reflected at the primary 184 of isolation transformer T4 will shift the Q-wave, and cause the inverter to enter a capacitive mode of operation. This will initially result in an increase in inverter frequency SWPup to the maximum frequency. The IC U4 will then enter the pre-heat and ignition procedure, leading to inverter shut-down due to Vmax being exceeded for a duration of Tstop.

Further Operation of the Safety Circuit

The safety circuit essentially requires that a DC current path extends through the red and blue filaments. The operation of the safety circuit has already been described for the start-up situation with two good lamps. As already discussed, the IC U4 has an internal STOP function which places the inverter in a standby state whenever the lamp voltage exceeds a predetermined level. When a lamp is removed or fails, then the lamp voltage sensed at pin V1 will exceed the preset stop level and the IC U4 will be put into the non-oscillating standby state.

The safety circuit H (FIGS. 2(b), 6) provides back-up shut-off protection to the STOP function which is internal to the IC U4. Whenever the voltage at node Z10 exceeds the voltage level corresponding to Vmax (of the IC U4 stop function) by about 10%, the zener diodes D19 and D20 will breakdown, allowing current to flow though the resistor R20 to ground. This renders the switch Q4 conductive, thereby draining the charge on the capacitor C20 to ground. This removes the voltage supply for the IC U4, turning IC U4 off and stopping inverter switching, resulting in switch Q5 switching back off.

The safety circuit also ensures that VDD power is re-supplied to the IC U4 when the failed lamp has been replaced by a lamp with good filaments, to thereby restart the IC U4 and inverter oscillation, when the mains supply is maintained at the input terminals 1',2' during replacement of the failed lamp. When the failed lamp is replaced with a lamp having two good filaments, the DC current will again flow through the blue and red filaments, causing the controller U4 to turn ON and cause the DC-AC converter to output a high frequency signal to the output circuit.

The circuit shown in FIG. 6 may not always prevent VDD power from being supplied to IC U4 if either of the red or blue filaments is broken, or either of the lamps is not present, during initial application of power to the input terminals 1',2'. If, for example, the blue filament has failed or is not present, current flow through line 174 will not be able to pass across terminals 222–221. However, since the ballast was initially off, the capacitor C26 will have no charge initially. The current in line 174 will thus tend to charge the capacitor C26, providing a current path through the winding 218 of transformer T3 and the remaining parts of the DC path previously described to render Q5 conductive, allowing charging of the VDD capacitor C20. The same effect will occur for initial charging of the capacitor C28 if the red filament is broken or not present during initial application of power to the input terminals 1',2' Thus, it is possible for a voltage to appear at the output for the first ½ sec after ballast turn-on (Tstop) even if a lamp is not present. The isolation transformer T4 provides substantial protection against shock hazard in this event.

Appendix A lists values for various circuit components.

Dimming

FIG. 2(c) shows a dimming interface circuit which can automatically distinguish among three different types of control signals received at power line inputs 1', 2' and convert the control signal to a DC voltage dim signal that determines the dimming level. The dim signal is fed to the "dim input" of the IC-U4.

The three control signals that the interface can handle are those from (i) a phase angle dimmer, (ii) a step dimmer and (iii) a coded continuous-type dimmer according to one aspect of the invention in which the dimming commands are encoded by a respective occurrence signature of a selected perturbation within a control period.

1. Phase Angle Dimmer

Figure 12A:
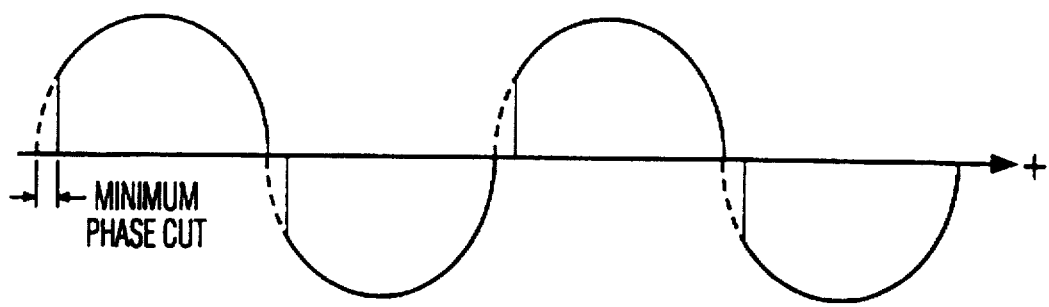
FIGS. 12(a) and 12(b) illustrate phase angle control of the mains voltage by a triac-type dimmer.
Figure 12B:
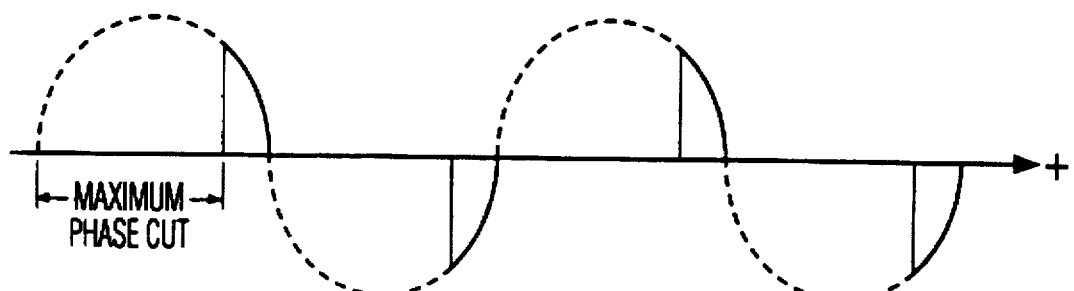

A commercial triac dimmer is the phase angle dimmer normally used for controlling incandescent lamps, and has also been used for dimming fluorescent lamps. It cuts the power line phase angle to get different average voltages. With more phase cut, the average line voltage is lower and the incandescent lamp is dimmed to a greater extent (lower light level). FIGS. 12(a) and 12(b) illustrate the minimum and maximum phase cuts, respectively. The range of phase cut provided by commercially available dimmers is generally from about 40 to about 140 degrees. An "electronic dimmer" may also be used, which cuts the portion of the half-cycle immediately before the zero crossing.

2. Step Dimmer

Figure 13:
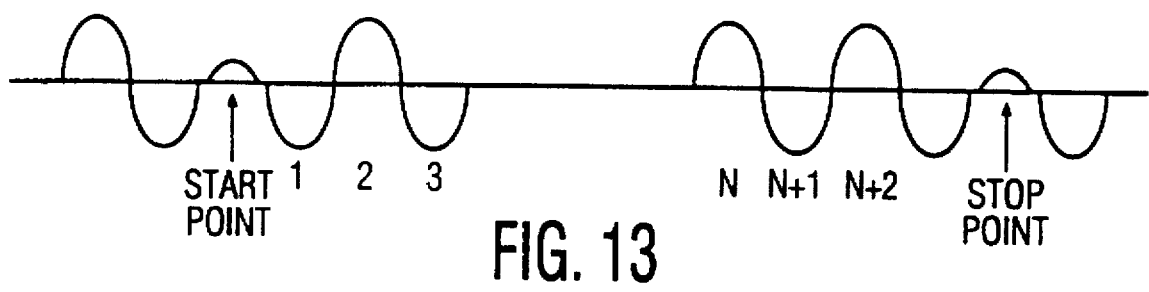
FIG. 13 illustrates modification of the mains voltage according to a known step-dimming technique.

The known step dimming controller transmits its control signal by modifying power line voltage. As shown in FIG. 13, the control signal is formed in a pair. The first amplitude drop marks the start point and the second amplitude drop marks the stop point of the control signal. The number of half-cycle waves, or elapsed time, between the start point and stop point signifies a pre-selected dimming level. As an example, the number of half-wave cycles between the start and stop points may relate to the dimming level as follows: 17=100%, 19=75%, 21=50%, 23=25% and 25=9%. Instead of a reduction in amplitude, the start and stop points may alternatively be marked by a complete cut of the respective half cycles. Further details of this technique and of a suitable wall controller are set forth in U.S. Pat. Nos. 5,055,747; 5,068,576; and 5,107,184 (all to Hu et al).

3. Coded Dimmer

In the coded communication technique according to the invention, a selected number of line cycles or fundamental periods, forms a control period. The occurrence signature of pre-selected perturbation within the control period is indicative of a control command, for example, to change an operating characteristic of the lamp, such as the light level. The "occurrence signature" of the perturbation within the control period may simply be the number of times that the perturbation occurs within the control period. The occurrence signature may also be the location pattern of the perturbation within the control period. For example, the perturbation may be encoded to form a binary number within the control period.

In an attractive embodiment for dimming, a first fixed number of perturbations represents a command to increase the light level by a pre-selected incremental amount and a second, different number of perturbations represents a command to lower the light level by the pre-selected incremental amount. A third number of cuts in the control period represents the command to keep the light level the same. Favorably, no (zero) cuts per control period represents the command to maintain a constant light level. This has the advantage that when no change is desired, there are no distortions introduced into the power line waveform and thus no possibility of causing flicker in the fluorescent lamps. Also, since no distortions are introduced there are no adverse effects on THD, power factor or component stress. In the following examples, the perturbation is a phase cut in the nominal waveform of the fundamental periods, since this type of perturbation is easy to implement by controlling the firing of a triac.

FIGS. 14(a) to 14(c) represent three power line waveforms from a wall controller illustrating this particular dimming implementation. The control period selected is three (3) full line cycles at the wall controller, which after rectification is six (6) half-wave cycles at the interface circuit in the ballast. FIG. 14(d) is a waveform on the receiver side, i.e. of the dimming interface, and is the differential of the power line waveform of FIG. 14(c). If there is no light intensity change requirement, the power line waveform will not be modified as shown in FIG. 14(a). Thus, no additional distortion will be added into the line. In this case, there would be no pulse on the differential receiver waveform since the line voltage is a smooth sine signal. A control signal to decrease the light is represented by a phase cut in one positive side waveform during every three line cycles (FIG. 14(b)), which would result in one pulse on the receiver waveform after decoding (differentiation) by the receiver. A control signal to increase the light level is represented by two cuts in the control period (FIG. 14(c)) such that the receiver waveform will have two pulses during every three line cycles, as illustrated in FIG. 14(d).

In the ballast, the light will remain unchanged if no pulse is detected by the receiver in the rectified power line waveform. If one pulse or two pulses are detected during every three line cycles (six half-wave cycles after rectification), the light will change one step, i.e. by the pre-selected increment, to the corresponding direction.

Experience shows that continuous dimming can be mimicked if the number of steps between the lowest and highest light levels is large enough; in other words, if the increment by which the light is changed each time is very small. In the following embodiment, the number of steps is selected to be 100. If an increase or decrease control signal is generated continuously by the wall controller, it will take about 5 seconds to change the light intensity from the lowest level to the highest level.

Figure 15:
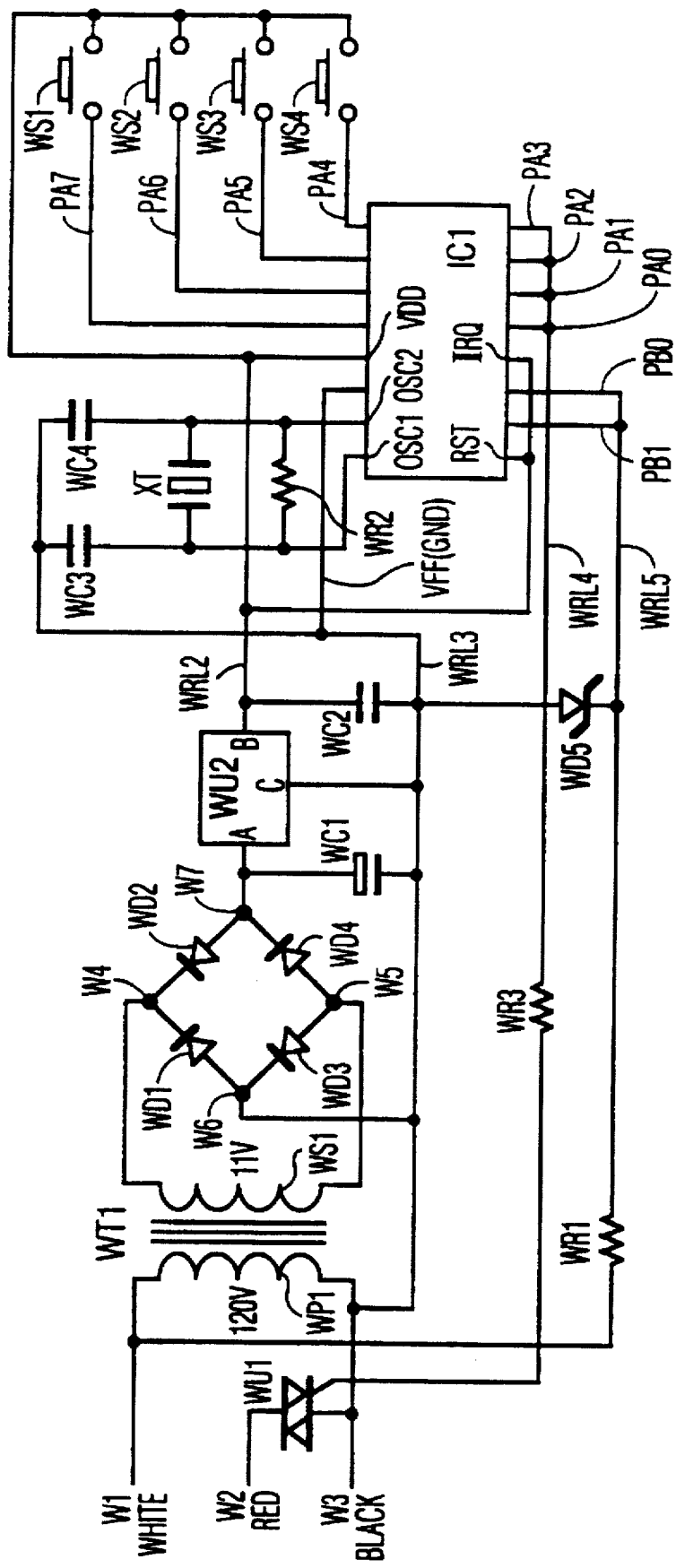
FIG. 15 is a circuit diagram of a wall controller for producing the coded waveforms of FIGS. 14(a)–14(c)

Wall Controller:

The main function of the remote transmitting device for the coded dimming technique is to generate the control patterns illustrated in FIGS. 14(a)–14(c). The circuit diagram of a suitable transmitter, in the form of a wall controller, is shown in FIG. 15.

Two input terminals W1 and W3 are for connection to the white (neutral) and black (hot) lines of the power line, respectively. Output terminal W2 connects to the red output line which carries the encoded, hot AC signal to the ballast. A triac WU1 is connected between the terminals W1 and W2. A step-down transformer WT1 has each end of its primary winding WP1 connected to a respective one of the terminals W1 and W3. The ends of the secondary winding WS1 are connected to respective nodes W4, W5 of a full-bridge rectifier formed by the diodes WD1–WD4. The cathodes of the diodes WD1 and WD2 are connected to node W4 and the anodes of the diodes WD3 and WD4 are connected to node W5. The cathode of the diode WD3 and the anode of the diode WD1 are connected at node W6 and the cathode of the diode WD4 and the anode of the diode WD2 are connected at node W7.

The triggering of the triac U1 is controlled by an 8-bit microcontroller IC1 with a built-in oscillator. A suitable controller for IC1 is the Motorola MC68HC05k1. The microcontroller IC1 has two ports A, B. Port A has eight terminals and port B has two terminals. There are four push button switches WS1–WS4 to control the following functions: on, off, light increase and light decrease. The microcontroller IC-1 reads the status of these switches through its terminals PA4–PA7 of port A.

The node W7 of the rectifier is connected to IC1's power supply VDD via line WRL2 which includes a 5V voltage regulator WU2. An electrolytic capacitor WC1 is connected between the lines WRL3 and WRL2 at the input (A) side of regulator WU2 to filter the DC ripple from the rectifier. A capacitor WC2 is connected between these same lines at the output side (B) of regulator W2 to filter noise. The zener diode WD5 bridges lines WRL3 and WRL5, with its cathode connected to the latter line. Terminals RST (reset) and IRQ (interrupt request) are also connected to the +5V output of regulator WU2. The ceramic resonator XT is connected across oscillator terminals OSC1 and OSC2, with the components WC3, WC4, and WR2 being specified by the resonator manufacturer to ensure proper operation of the resonator XT.

The microcontroller IC1 needs a line voltage zero-crossing signal as a reference to trigger the triac WU1. This signal is provided by the resistor WR1 and the zener diode WD5, and is input at terminals PB0 and PB1. Since the voltage at the cathode of the diode WD5 is only 4.7V, which is much less than the power line peak voltage, it provides the logic signal "1" and "0" on terminals PB0 and PB1 when the line voltage is crossing zero. Controller IC1 sends the triac trigger signal out through terminals PA0 through PA3 via line WRL4 to the triac WU1. The resistor WR3 limits the current to the triac WU1 from the triac trigger signal. These terminals are parallel connected to increase drive reliability. If the microcontroller IC1 sends out a trigger signal immediately upon detection of the line voltage zero-crossing, there is no modification for the power line waveform. This provides the waveform of FIG. 14(a) for a constant light level. To provide the phase cut in either one or two half-cycles to generate the signals to increase or decrease the light level (as shown in FIGS. 14(b) and 14(c)) the trigger signal is delayed about 1.39 ms after the zero-crossing for the respective half-cycle. This provides a small phase cut of about 30 degrees.

Figure 16:
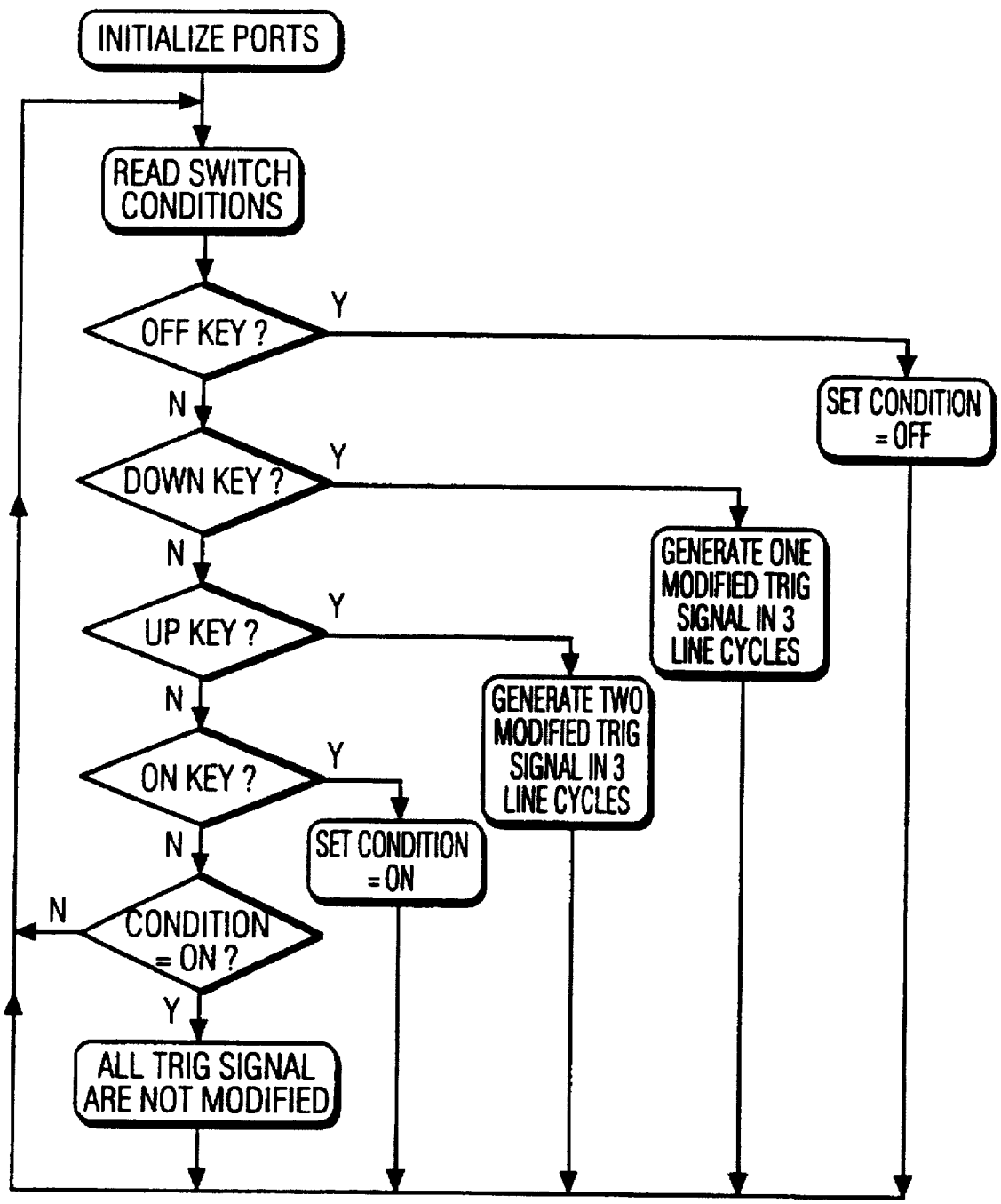
FIG. 16 is a flow chart for controlling the operation of the wall controller of FIG. 15.

FIG. 16 is a program flow chart for the wall controller. After initializing port directions, the program goes into a loop that reads the status of the four switches WS1–WS4. If a switch is activated, the program will perform the corresponding function. For example, when switch WS4 (down key) is pressed, the wall controller will produce the waveform of FIG. 14(b) to dim the light and when the switch WS3 (up key) is pressed the waveform of FIG. 14(c) will be produced to increase the light level. When switch WS1 (on key) is pushed, power will be supplied to the connected lamp controller without any perturbations imposed on the AC power line signal. When switch WS2 is pressed, the AC power line signal is completely interrupted so that no power is supplied to the connected ballast.

Interface Circuitry

FIG. 2(c) is a schematic of the receiver, or interface circuit, in the ballast. FIGS. 17(a)–(e) show different waveforms at several key nodes within the circuit.

The heart of the interface circuit is the microcontroller IC2 (for example, a Z86C04 from Zilog, Inc.) which converts the dimming control signals to a corresponding PWM (Pulse Width Modulation) output. The microcontroller IC2 has three inputs P31, P32 and P33 which accept the coded, step, and phase angle dimming signals, respectively. The PWM output (dim) signal is formed on terminal P27 and is converted to a DC signal for input to the half-bridge driver at the 'dim' input of IC-U4 to adjust the power to the lamp.

Node A (also ref. Z8) of the rectifier circuit B is connected to ground (ref. Z9) via a voltage divider network consisting of the resistors GR1, GR2 and GR3. The input P32 is connected to a node C between the resistors GR2 and GR3. The input P31 is connected to a node B through a differential circuit formed by GC2 and GR5. A zener diode GD6 parallel connects with GR5 to protect the input of the microcontroller U2. The input terminal P33 is connected to a node D between the resistor GR4 and the diode GD5. The microcontroller is powered at terminal VCC with a 5V voltage source, in this case from voltage regulator U3. An external ceramic resonator XL1 (2MHZ) is connected between the clock terminals X1, X2. The clock terminals are connected to ground via the capacitors GC3 and GC4, respectively, which ensure proper resonator operation. The capacitor GC5 is connected between ground and the voltage supply to suppress noise. The resistors GR6, GR7 and capacitors GC6 and GC7 smooth the PWM output signal from terminal P27 to an average DC signal for input to the dim input of the IC-U4.

Figure 17E:
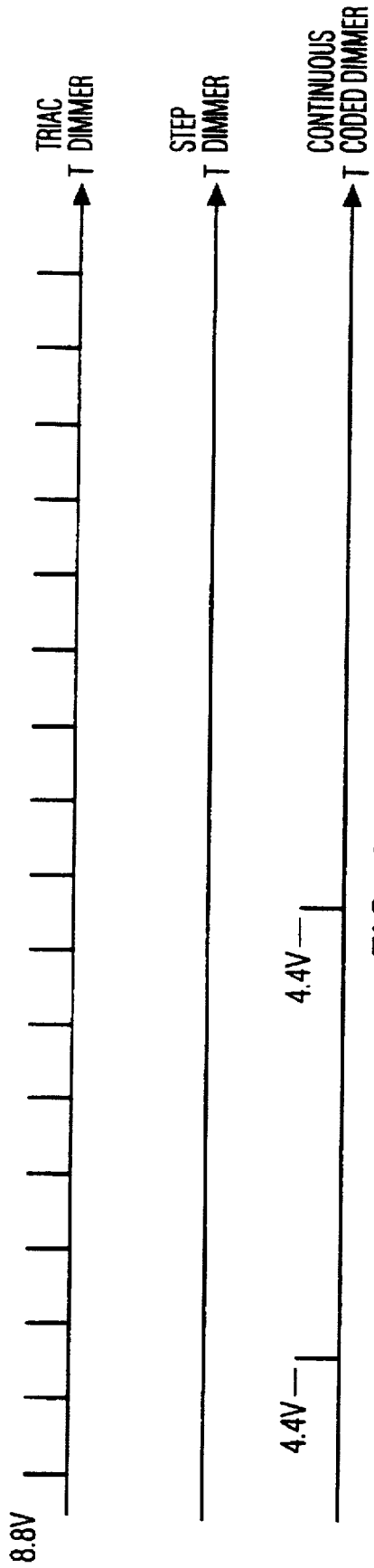
Figure 18:
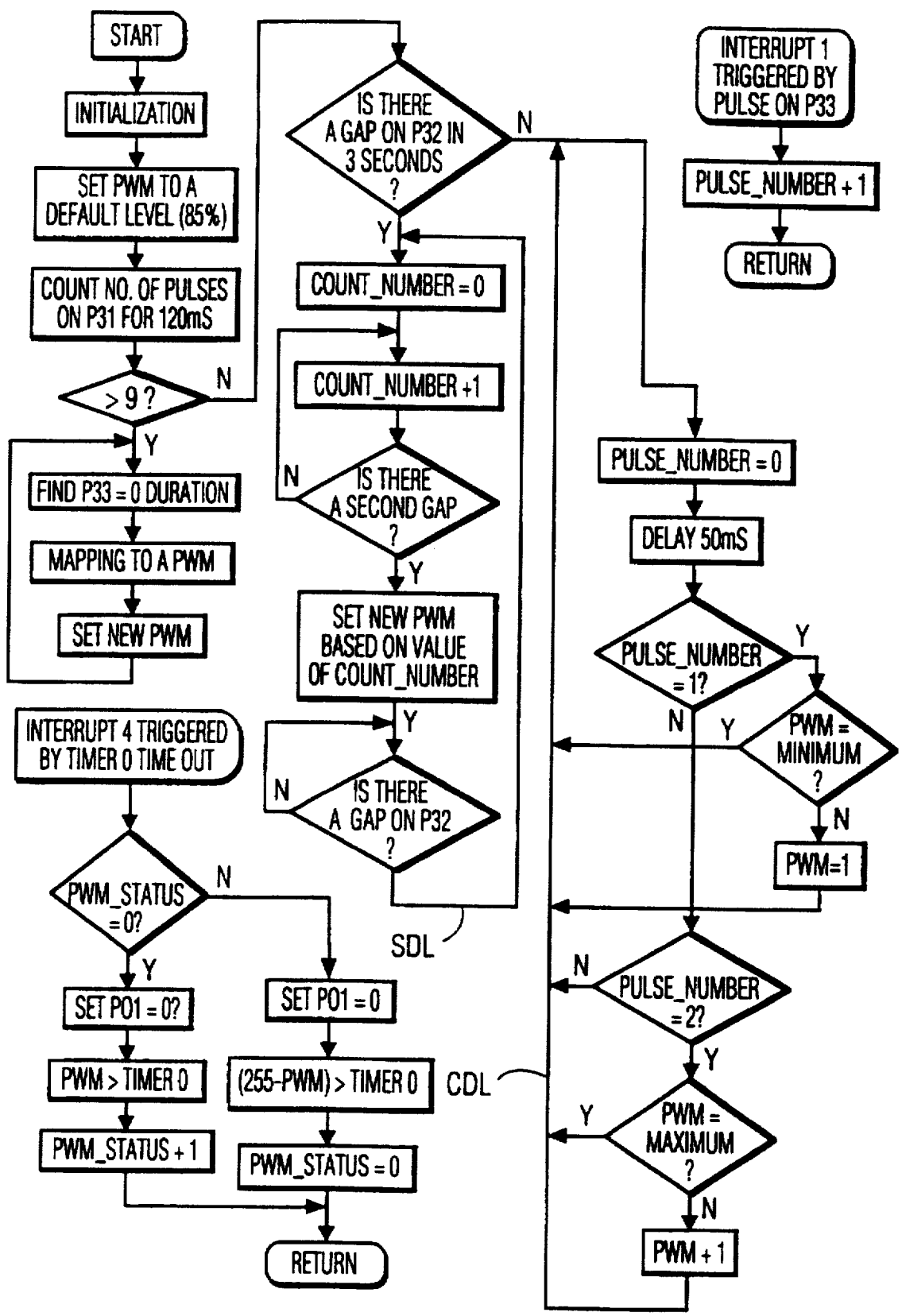
FIG. 18 is a flow chart for controlling the operation of the interface circuit of FIG. 2(c)

FIG. 18 is a software flow chart for the microcontroller IC2. When power turns on, i.e. the mains voltage from the wall controller is provided at ballast input terminals 1',2', the microcontroller IC2 is initialized and the output P27 is set at a default PWM value for a default light level, for example 85% light output. FIG. 17(a) shows the waveforms and voltage levels present at node A for each of the three types of wall controllers. The receiver determines which type of external wall controller is installed, i.e. connected to the ballast inputs 1', 2'.

In the present implementation, the controller first determines whether a phase angle dimmer is installed. A phase angle dimmer is distinguished from the step and coded-type dimmers by counting the number of pulses on the terminal P31 for 120 ms. Terminal P31 is connected to node E, which is the output of the differentiating circuit formed by the resistor GR5 and the capacitator GC2. The waveform and voltage levels present at node E for each of the three types of dimming controls is shown in FIG. 17(e).

The microcontroller input threshold level is about 2.5V. This means that it is logic "1" if the input is above 2.5V and logic "0" if the input is below 2.5V. A logic "1" will be received on terminal P31 only when the voltage on P31 exceeds 2.5V. The differentiating circuit provides a pulse to terminal P31 of greater than 2.5V (logic "1") whenever the sinusoidal half-cycle includes a phase cut as with a phase angle dimmer or the coded dimmer (compare FIG. 17(e) with FIGS. 14(a),(b)), but not for a half-cycle of reduced magnitude as with the step dimmer. The rectified DC output fed to the interface circuit is 120 HZ pulsed DC. During 120 ms, there are at least 13 pulses if a phase angle dimmer is installed, and at most 6 pulses if the coded dimmer is installed and no pulse if a step dimmer is installed. The program routing goes into a loop which only deals with a phase angle dimmer (see loop PAL) if the number of pulses is greater than 9. Thus, control signals from the phase angle dimmer are identified and distinguished from those of the other two types of dimmers by differentiating the input signal and generating a detection signal in the form of a pulse for each occurrence of phase cut, and determining the number of pulses in a selected time period.

If the number of pulses is not greater than 9, then the installed lighting controller could be either a step dimmer or the coded dimmer. One feature of the step dimmer can be used to separate these two. Whenever the step dimmer turns from "off" to any desired light level, the known step dimmer sends out a control signal within a known time period, for example of 2.4 seconds. The control signal can be detected by measuring the logic status on the terminal P32, which is connected to node C. The waveform and voltage levels are shown in FIG. 17(c). In the FIG. 17(c) waveforms, the control signal generated by the coded dimmer will reach logic "1" during every half-cycle, since the peak voltage for each half-cycle is greater than the threshold level of terminal P32. For a step dimmer control signal, this is also true except for the start and stop cycles. During these two cycles, the peak voltage will only reach half of the normal value (about 1.75V, which is lower than the logic "1" level.) This means that there is a pulse gap whenever the start and stop signals are generated. If there is a gap (logic "0") on P32 during the first 3 seconds, the installed dimmer must be of the known step type and the software goes into a step dimming control ("SDL") loop. Otherwise the coded dimmer is installed and the software goes into a continuous dimming control ("CDL") loop. Thus, control signals from a step-type dimmer are identified, and distinguished from those of the coded dimmer, by generating a second detection signals in the form of missing pulses, and determining the number of such second detection signals occurring in a second time period.

If a standard ON/OFF wall switch is installed instead of any dimming control device, the PWM output signal is set to the default level, since the power line is unmodified and the microcontroller U2 will not detect any pulses at its inputs.

PWM Control

Figure 17F:
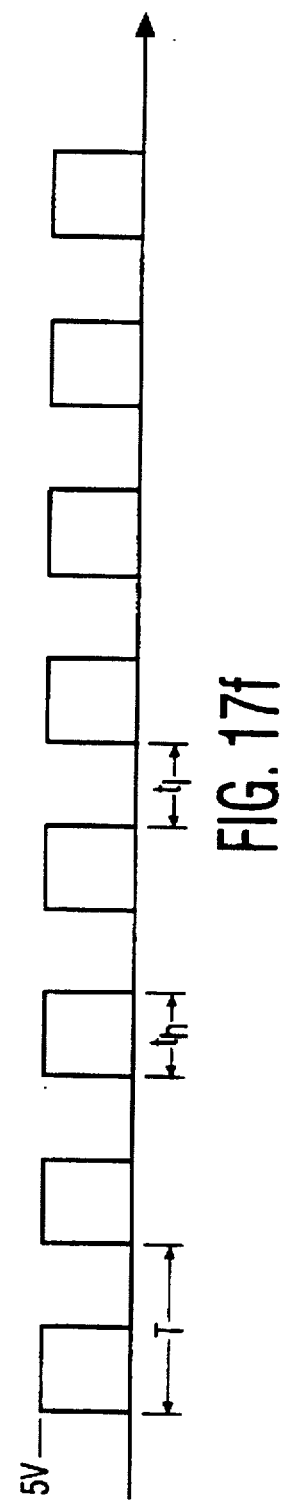

The microprocessor IC2 includes an 8-bit register named PWM which controls the PWM output signal. A timer 0 in the microcontroller determines the duration of $t_h$ and $t_L$ based on the PWM value (see FIG. 17(f)). After the timer 0 times out, an interrupt 4 will be generated. In the interrupt subroutine, the first test is the current PWM register output status. If the current PWM register output is logic "0", then it sets the PWM register output to 1 and installs the PWM value into timer 0. If the current PWM register output is logic "1", it sets the PWM register output to logic "0" and installs (255-pwm) into timer 0. The time to invoke the next interruption is proportional to the value installed into the timer 0. The time of $t_h$ plus $t_L$ is set to be independent of the PWM value so that the PWM signal frequency is a constant. Thus, with a larger PWM value, the PWM register has more time to stay in logic "1" condition and provides a higher average output dimming control voltage. The dimming control voltage range is set from 0.4V to 3V which means the PWM duty cycle should be 8% to 60%, since logic "0" is zero volts and logic "1" is 5 volts.

Phase Angle Dimming Control Loop

The phase angle dimming control procedure (the PAL loop) reads the duration of logic "0" on the terminal P33. The logic "0" time is proportional to the phase cut angle from the phase angle dimmer. Larger phase cuts, indicating lower light levels, produce longer logic "0" times. Longer logic "0" times produce a smaller PWM value, to thereby cause a lower DC signal level for the dim input of IC-U4. Since the relationship between logic "0" duration and the PWM value may not be linear, a look-up table is included in the microprocessor IC2 to convert the logic "0" duration to a desired PWM value.

Step Dimming Control Loop (SDL)

The Step dimming control (SDL) loop always looks for a gap, i.e. a change in logic status from "1" to "0" caused by a missing pulse, on the terminal P32. The PWM value does not change if there is no gap. If a gap is found, a register named "count number" starts to count the number of fully rectified waves on P32 until it finds the second gap. Then, the SDL loop sets a new PWM value corresponding to the number counted in the register "count number".

Coded Dimming Control Loop (CDL)

A pulse on the terminal P31 invokes a subroutine "interrupt 1" The "interrupt 1" procedure increases the value of a register named "pulse number" by 1. The coded dimming control (CDL) loop checks the value in the register "pulse number" every 50 ms. Since 50 ms equals 3 line cycles, the value of the register "pulse number" will determine if the light level should change. When the value in the register "pulse number" equals zero (0) there is no pulse, so no change in the light level or in the PWM value occurs. When the register "pulse number" equals one (1), the PWM value is decreased until it reaches the preset minimum value. When the register "pulse number" equals two (2) the PWM increases until it reaches a preset maximum value.

Thus, the interface circuitry enables the ballast to automatically accept dimming inputs from each of three different light controllers and produces a DC signal, input to the controller IC-U4, to control the light level of the fluorescent lamps. The microcontroller includes a respective decoding loop for each of these control techniques. The microcontroller and associated circuitry first identifies which type of control signals are being received, and then activates the respective decoding loop to decode the signals and output the appropriate DC dim signal via the PWM control.

Additional Comments on the Coded Communication Technique and System

One of the major advantages of the coded communication technique is that there is no modification to the power line voltage during normal circumstance, i.e. when no change in the light level is desired. Additionally, flicker of the lamp during dimming is avoided by selecting the phase cut small enough so that it does not appreciably change the energy stored in the main storage capacitor (C10, FIG. 2(a)) in each half cycle. The main capacitor C10 stores energy to power the circuit when the line voltage crosses zero. It is recharged mainly after 45 degrees, so a phase cut below this angle will not cause visible flicker. In the present implementation, the phase cut is selected as 30 degrees. The perturbation is not limited to phase cuts, but depending on the implementation, can be any variation imposed on the nominal waveform which is detectable by a receiver. However, for two-wire dimming applications for gas discharge lamps, the perturbation should be selected so as to minimize variation in the average line voltage so as to avoid lamp flicker Additionally, the technique can be highly immune to line interference. In the above implementation, the pulse amplitude in the ballast interface circuit is around 50V for 120V power line so it is not affected by noise.

Additionally, the coded technique is not limited to continuous type dimming, but may also be used for step dimming. For instance, each of a plurality of distinct dimming levels would be indicated by the wall controller by a respective number of perturbations in a control period (e.g. 1=50%, 2=75%, 3=80%, 4=90%). The receiver would then output a dimming signal for input to the half-bridge receiver to operate the lamp at the dimming level corresponding to the decoded command.

The control signals, while used for dimming in the above example, can be used to communicate commands for other tasks for the ballast as well. Furthermore, while the coded technique is particularly suited for dimming low pressure discharge lamps, it may be implemented to communicate commands for controllers for other types of electric lamps as well, such as halogen, incandescent and HID.

Still further, the number of fundamental cycle periods in a control period can be increased so as to accommodate more control signals. For the disclosed embodiment, the phase cut was made only in the positive half-cycle of the line voltage, but could be made in both the positive and negative half-cycles. Also, the phase cut could be made before the zero crossing, instead of after.

Figure 19:
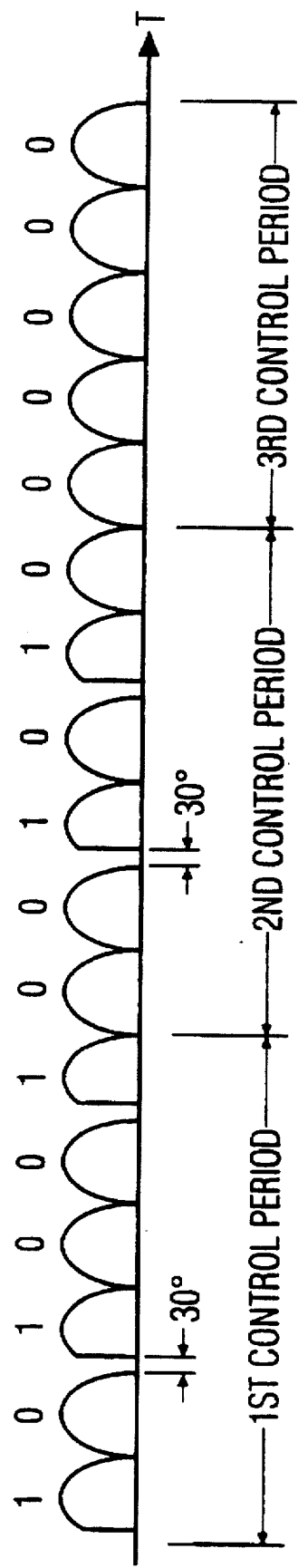
FIG. 19 illustrates a binary coding for the phase cuts.

Also, as previously discussed, control commands can be encoded with a specific pattern, such as binary, of the perturbations within the control period. An exemplary binary code is illustrated in FIG. 19. In this example, half-cycles with a phase cut signify logic "1" and those without signify logic "0". In FIG. 19, the first control period is encoded with the binary number "101001" and the second control period is encoded with the binary number "001010". The advantage of a pattern is that it accommodates a greater number of distinct commands for a control period of a given number of fundamental periods.

Figure 20:
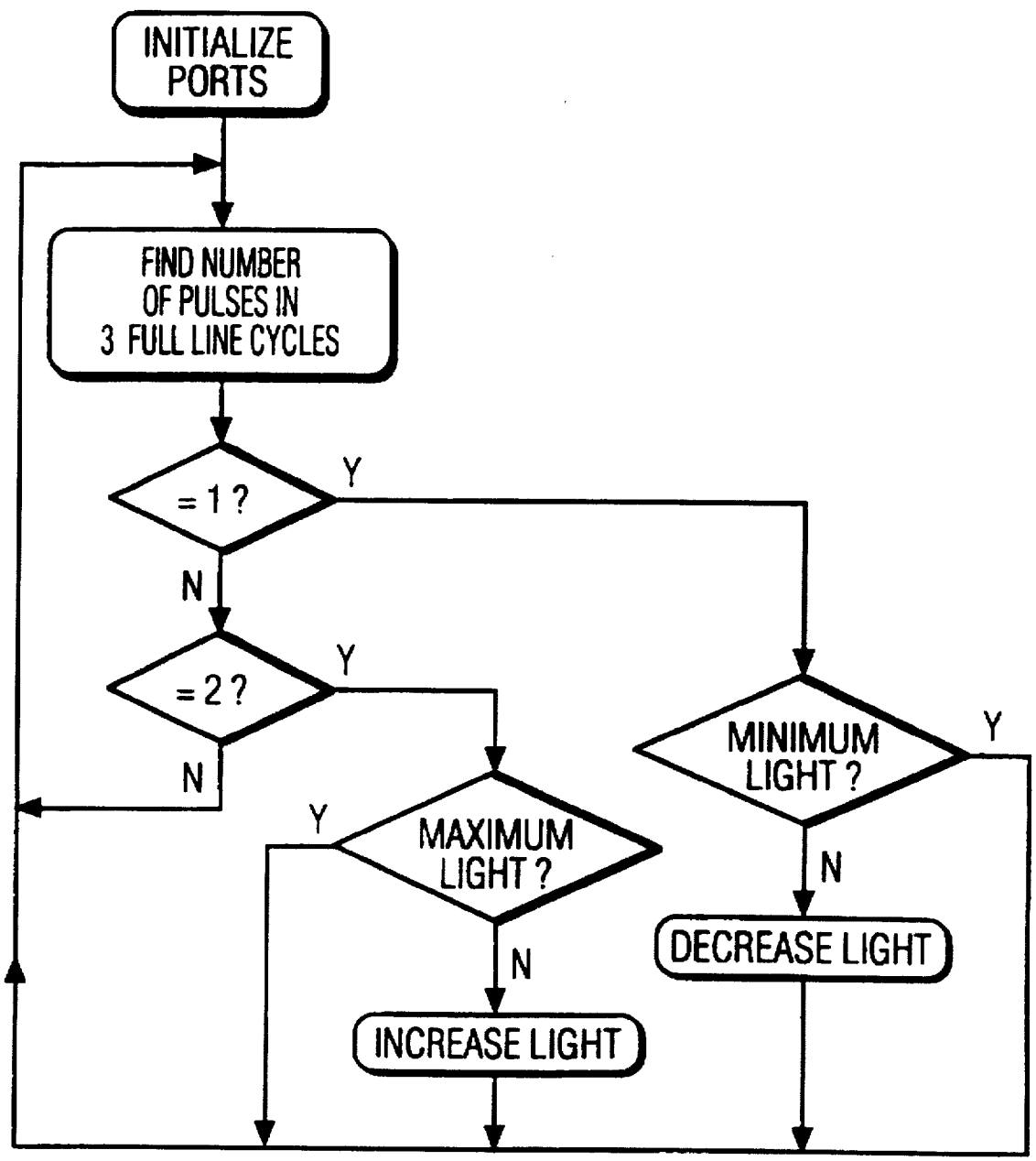
FIG. 20 illustrates a flow chart for an interface circuit dedicated to receiving the coded continuous dimming commands only.

The interface circuit need not be "universal" but can be dedicated to the coded technique. A logic flow chart for such a dedicated interface circuit for use with the wall controller of FIG. 15 is illustrated in FIG. 20.

Additionally, in the disclosed embodiment, the encoded commands are carried by the power line feeding the ballast. The coding technique can also be used with a separate control line feeding the lamp controller, though this would not be as convenient as the two-wire system described herein.

OTHER CIRCUIT FEATURES

An important advantage of the ballast according to the invention is the design of the EMI filter and an offset feature of the pre-conditioner circuit which together preserve the accuracy of the phase angle from a phase angle dimmer, despite the power and signal paths being on the same lines because of the two-wire connection between the ballast and wall controller.

The LC filter provides EMI suppression and includes equally sized chokes L1 and L2 and capacitors C3 and C4. (FIG. 2(a)) In typical ballast applications, the LC filter is designed by selecting the appropriate pole frequency given by $f_p=1/(2\Pi\sqrt{LC})$. Thus, the product of L and C determines the pole frequency. Generally, the inductance is selected to be small and the capacitance to be large so as to minimize the physical size of the inductors in the EMI filter. For a pole frequency of about 8 Khz, exemplary values are L=800 µH and C=0.5 ufd.

The proper operation of an external dimmer having a triac (e.g. a triac dimmer, or a coded phase cut dimmer disclosed herein) requires that the LC filter be sufficiently damped with the loading introduced by the pre-conditioner. Without proper loading, oscillations occur in the EMI filter which can cause the triac in the dimmer to fire improperly. Inadequate damping of the filter also leads to excessive peak current on the chokes L1, L2 and over voltage (up to double the line peak) at the input of the inverter.

The loading required to prevent improper triac firing is reduced by selecting the LC filter with a relatively high characteristic impedance. The characteristic impedance is related to the $\sqrt{L/C}$, so contrary to the standard design philosophy, the inductance must be made large relative to the capacitance. Thus, in FIG. 2(a) inductors L1 and L2 are made relatively large and the capacitors C4 and C3 are relatively small. A small physical size for the inductors L1 and L2 is achieved by using a powdered iron core.

The EMI filter impedance is selected so that the peak overshoot of the EMI filter is less than the average value of the DC bus voltage at worst line conditions. This is critical to prevent triac misfiring, since overshoot can cause negative currents that will misfire the triac in the dimmer. Additionally, the pre-conditioner only operates properly to control the power factor and DC bus voltage when the peak of the rectified input is less than the DC bus voltage. Additionally, peak overshoots greater than the DC bus stress circuit components. In selecting the impedance, the "Q" of the EMI filter is given by $$Q = \frac{R}{\sqrt{L/C}} \; ; \text{and } k = \frac{1}{2Q}.$$

The filter overshoot "Vovershoot" is given by the peak filter output voltage "Vopk"—peak input voltage "Vinpk", also given by $$V_{overshoot} = \text{EXP}\left[\frac{-\Pi K}{\sqrt{1-K^2}}\right] = \text{EXP}\left[\frac{-\Pi}{\sqrt{4Q^2-1}}\right]$$

In FIG. 2(a), L1 and L2 are each an E75-26 (Magnetics) core with an inductance of 2.3 mH and a saturation current higher than 2.0 A. The capacitance of C4 and C3 jointly was chosen to be 0.147 uF for EMI suppression, yielding a characteristic impedance $\sqrt{L/C}$ of 188 ohms for the filter. R is the normal damping resistance presented by the pre-conditioner (for 60 W load and a 120 V line) and equals 240Ω in the present implementation. For the present filter, Q=1.28, yielding a Vovershoot of 0.26. For worst line design condition Vinpk=1.26×187 V(i.e. 120 Vt 10% √2))=236 V. This is much less than the 280–300 V DC bus voltage. By contrast, for the standard filter given above, the characteristic impedance $\sqrt{L/C}$=40, Q=6, Vovershoot=77%, leading to Vopk of 330V, well above the DC bus voltage. This leads to triac misfiring as will be illustrated in FIG. 22(a).

The damping is further improved by making the pre-conditioner slightly non-linear near the zero-crossing of the input voltage. The selected IC (Linfinity LX 1563) has this non-linearity which manifests itself as a relatively increased "on" time for the boost switch Q1 with lower voltages at the multiplier input, M_IN, pin.

The damping is made completely adequate, however, for all dimming levels only by making the pre-conditioner operate continuously and reliably even when the input voltage is very low or zero, as is the case when the triac is blocking. This is accomplished by providing an offset voltage to the MULT IN pin. When the triac is blocking, the input voltage is zero for that portion of the 120 HZ rectified line voltage as illustrated in FIG. 12(a). The voltage across the input capacitor C4 should closely follow the rectified input voltage, i.e. it should mirror the waveform of FIG. 12(a). Without an offset voltage, the MULT IN pin would sense the (scaled) voltage across the capacitor C4. The switching of switch Q1 is determined by the peak inductor current in relation to the voltage at the MULT IN pin. Both the switching frequency and the duration of time that Q1 is conductive is greatest at the peak of the rectified DC voltage and decreases as this voltage decreases. When the voltage at the MULT IN pin is at or near zero, as is the case when the triac is blocking, the IC U1 tends to keep switch Q1 non-conductive to a much greater extent since the peak inductor current is kept small to follow the input or MULT IN voltage. For longer periods of Triac blocking there may even be periods when the switch is completely off. However, when the switch Q1 is non-conductive, there is no discharge path for the capacitor C4. Without a discharge path, the capacitor C4 cannot follow the rectified line voltage, in other words, the voltage across C4 will be held up.

By providing a small offset (125 mV) at the MULT IN pin of the IC U1, the total duration of time that the switch Q1 is kept conducting when the rectified voltage is at or near zero is increased and the switching is prevented from ever stopping. This allows sufficient discharging of the filter capacitor C4, allowing the voltage across the capacitor C4 to closely follow the rectified phase-controlled voltage. Thus, the preconditioner presents the LC EMI filter with a well damped resistive load during the entire line cycle and prevents the triac in installed the wall controller from misfiring.

Figure 21:
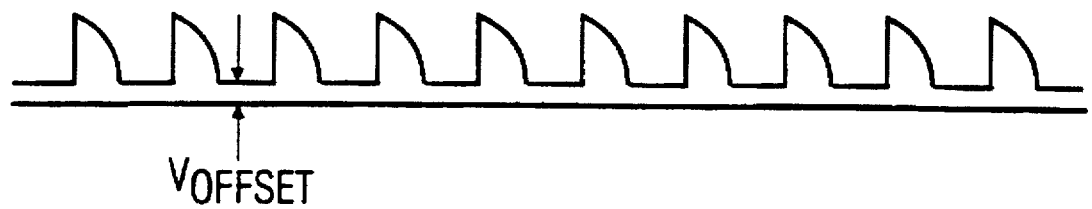
FIG. 21 illustrates the offset voltage sensed at the MULT IN pin of the IC U1.
Figure 22A:
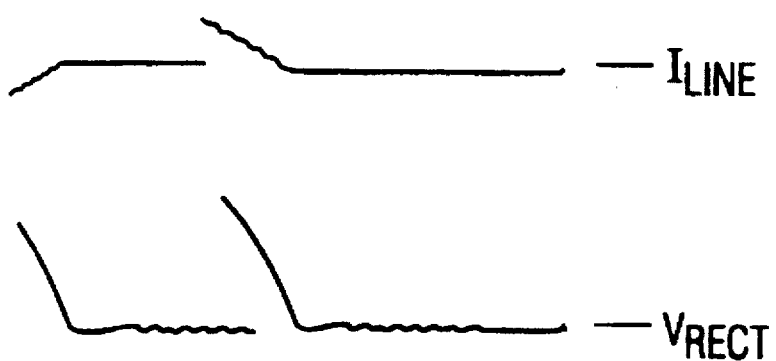
FIG. 22(a) illustrates the line current and rectified voltage in the case of triac misfiring.
Figure 22B:
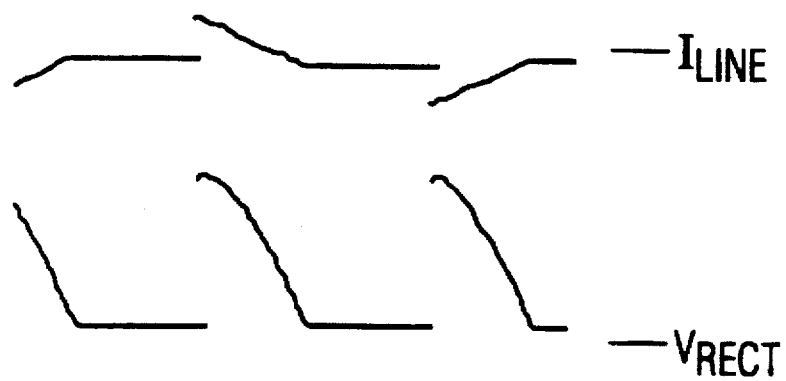
FIG. 22(b) illustrates the same waveforms with misfiring prevented by the pre-conditioner offset.

In the embodiment shown in FIG. 2(a), the offset voltage is accomplished by the resistor R8 of the pre-conditioner circuit. Whenever the inverter is operating, the inverter supplies a voltage to the $V_{in}$ pin. The resistor R8 bleeds off a small current to the junction between the resistors R5 and R6, which provides the offset voltage to the MULT IN pin. The voltage sensed at the MULT IN pin including the offset voltage is illustrated in FIG. 21, for the case of the conventional triac dimmer. Thus, when the triac is blocking, the IC U1 will continue switching the switch Q1 at high frequency, presenting a resistive load to the capacitor C4. FIG. 22(b) illustrates the line current and rectified line voltage provided by the EMI filter and pre-conditioner according to the invention for the triac dimmer. Three cycles are illustrated, showing no triac misfiring. Without the use of this offset, the pre-conditioner does not load the LC filter for certain combinations of phase angle and lamp power levels when the triac is in the blocking state, which would occasionally cause the triac to misfire and cause flicker in the light output. FIG. 22(a) illustrates the same waveforms for an EMI filter with the conventionally selected impedance and without the pre-conditioner offset. Note that the triac has misfired resulting in blocking of the third cycle. The rectified line voltage also shows oscillation due to capacitive hold-up by the EMI filter.

The pre-conditioner offset is also significant for ensuring the accuracy of the dim signal from the interface circuit. As mentioned above, the voltage across capacitor C4 will be held-up and not mirror the phase angle input signal if it is not loaded properly. In the case of an installed triac dimmer, such variations would effect the accuracy of the dim signal output by the interface circuit and input to the DIM pin of the IC U4.

Under non-dimming conditions, the disclosed ballast maintains a power factor >0.99, THD <10%, and a crest factor <1.6, so the circuit satisfies both the need for a dimmable ballast while also providing a high power factor ballast for non-dimming use. Additionally, the power factor remains high under all but the highest dimming (lowest light) conditions even when used with a phase angle dimmer. The use of the coded communication technique described herein, in which there is no alteration to the power line during steady operation, further improves the power factor even at the lowest dimming levels, while also keeping THD, EMI and component stress very low.

While there has been shown to be what are presently considered to be the preferred embodiments of the invention, it will be apparent to those of ordinary skill in the art that various modifications can be made without departing from the scope of the invention as defined by the appended claims. Accordingly, the disclosure is illustrative only and not limiting.

| APPENDIX A | |
|---|---|
| R1 | 110K, ½ W, 1% |
| R2 | 22.0K, ¼ W, 1% |
| R4,R26 | 300K, ¼ W, 1% |
| R5 | 1M, ¼ W, 5% |
| R6 | 6.8K, ¼ W, 5% |
| R7,R32 | 30.1K, ¼ W, 1% |
| R8 | 580K, ¼ W, 5% |
| R9 | Jumper |
| R10 | 1C, ¼ W, 6% |
| R11 | 22K, ¼ W, 5% |
| R12 | 330, ¼ W, 5% |
| R13 | 0.22, 1 W, 5% |
| R14 | 909K, ½ W, 1% |
| R15 | 768K, ¼ W, 1% |
| R16 | (used in uP version) |
| R17 | 100K, ¼ W, 5% |
| R18 | 1K, ¼ W, 5% |
| R19 | 5.1K, ¼ W, 1% |
| R20 | 200 Ohm, ¼ W, 1% |
| R21,R22 | 270, ¼ W, 5% |
| R23 | 82K, ½ W, 5% |
| R24 | 13.0K, ¼ W, 1% |
| R25 | 150 Ohm, ¼ W, 1% |
| R27 | 18.0K, ¼ W, 1% |
| R28 | 453K, ¼ W, 1% |
| R29 | 27, ¼ W, 5% |

APPENDIX A

| | |
|---|---|
| R30,R31 | 1.1K, ¼ W, 1% |
| R33 | 820, 2 W, 6% |
| R34 | 0.47, 1 W, 5% |
| R35 | 3.3, ¼ W, 1% |
| R36,R37,R38 | 470K, 5%, HV (Philips VR25) |
| C1,C2 | 3900 P, 3 KV, 20% |
| C3 | 0.047 UF, 400 V, 20% |
| C4,C25 | 0.1 UF, 400 V, 20% |
| C5 | 0.22 uf, 100 V, 10% |
| C6,C5 | 0.001 UF, 50 V, 20% |
| C7,C15,C14 | 0.47 UF, 50 V, 10% |
| C10 | 47 UF, 450 V, 20% |
| C11 | used in uP version |
| C12,C30,C17 | 0.1 UF, 50 V, 20% |
| C15 | 0.12 UF, 50 V, 10% |
| C16 | 0.68 UF, 5 CV, 10% X7R |
| C18 | 2200 pF, 100 V, 20% |
| C19 | 82P, 50 V, 2% |
| C20 | 4.7 UF, 16 V, 20%, Elco |
| C21 | 1800P, 1 KV, 10% |
| C22 | 0.22 uF, 100 V, 20% |
| C23 | 0.0058 UF, 2 KV, 5% |
| C24 | 0.0033 UF, 250 V, 6% |
| C26,C28 | 0.33 UF, 50 V, 10% |
| C27 | 0.68 UF, 50 V, 10% |
| C29 | 220 PF, 1 KV, 10% |
| C31 | 68 pf, 3 KV, 10% |
| D1,D2,D3,D4 | BYD + 13 G |
| D8,D11,D14,D16 | BYD33J |
| D7,D9,D10,D13,D17 | 1N4148 |
| D8 | 1K52539 (25 V, 5%, ½ W) |
| D12 | B2703 C15 (15 V, 3%, 6 W) |
| D18 | BAX14, 20 V, 2A 5Dns |
| D19,D20 | BZX 79 C43, ½ W, 5%, 43 V |
| Q1,Q2,Q3 | IRF 730 |
| Q4 | PN2222 |
| Q5 | 2N39C4 |
| Q6 | 2N5550 |
| V1 | S14X150, 150 V, 10% |
| F1 | 1CA 125 V, PN PICO |
| XL | used in uP version |
| U1 | LX1583 (Unifinity vDA4882 (Siamens) |
| U2 | used in uP version |
| U3 | 78L05 |
| U4 | ALPHA (U620i0BA) |
| L1,L2 | N = 196, *29, EE19 BOBBIN E75-26 CCRE |
| T1,T2 | 5x #34 Triola #30 PC40-EF25, 92 MIL GAP |
| T3 | 3T:BT, 0.36 Arms |
| T4 | 030 TRIPLE, #28 TRIPLE 12-PIN BOBBIN, PC40-EF25 |

What is claimed is:

1. A controller for an electric lamp, comprising:
   a) a receiver for receiving an "input signal carrying control commands", said input signal having a fundamental period with a nominal voltage waveform, said receiver including decoding means for decoding control commands present in the input signal according to at least two of:
      (i) a first control technique wherein commands are indicated by the phase angle of a phase angle cut in the nominal waveform;
      (ii) a second control technique wherein commands are indicated by the number of fundamental periods between start and stop points of the command, the stop and start points being fundamental periods having a nominal voltage less than the nominal waveform; and
      (iii) a third control technique wherein commands are indicated by an occurrence signature of a pre-selected perturbation in the nominal waveform occurring within a control period of a pre-selected number of fundamental periods; and
   b) means for controlling the operation of the electric lamp in response to the decoded command.

2. A lamp controller according to claim 1, wherein said decoding means includes means for decoding commands from each of said three control techniques.

3. A lamp controller according to claim 2, wherein:
   said decoding means includes first means for decoding control commands according to said first control technique, second means for decoding control commands according to said second control technique, third means for decoding control commands according to said third control technique, and identifying means for identifying the control technique of commands encoded according to any of said first, second and third techniques and for activating the respective one of said first, second and third means corresponding to the control technique identified by said identifying means.

4. A lamp controller according to claim 3, wherein said decoding means includes means for generating a first detection signal for each occurrence of (i) a said phase cut in said first control technique and (ii) a said perturbation in said third control technique.

5. A lamp controller according to claim 4, wherein said means for generating said first detection signal includes means for differentiating the input signal.

6. A lamp controller according to claim 4, wherein said means for generating said first detection signal generates a said first detection signal when said perturbation for said third control technique is a phase cut.

7. A lamp controller according to claim 4, wherein said identifying means first tests for the presence of control commands according to said first control technique by counting the number of first detection signals generated in a first pre-determined time period.

8. A lamp controller according to claim 7, wherein in the absence of control commands according to said first control technique, said identifying means then tests for the presence of control commands according to said second technique; if the control commands according to said second technique are identified, said identifying means activates said second means of said decoding means and if control commands according to said second technique are not identified, said identifying means activates said third means of said decoding means.

9. A lamp controller according to claim 8, wherein said identifying means includes means for generating a second detection signal in response to the presence of a said start and stop point according to said second control technique.

10. A lamp controller according to claim 9, wherein said identifying means tests for the presence of commands according to said second control technique by counting the number of said second detection signals generated in a second pre-determined time period.

11. A lamp controller according to claim 10, wherein said means for controlling controls a gas discharge lamp.

12. A lamp controller according to claim 10, wherein said means for controlling controls a low pressure mercury vapor fluorescent lamp.

13. A lamp controller according to claim 12, wherein said controller includes power inputs for receiving an AC power signal for powering said controller, and said receiver is coupled to said power inputs for receiving control commands carried by said AC power signal.

14. A lamp controller according to claim 13, wherein said nominal waveform is sinusoidal and said fundamental period is a half-cycle of a full-wave rectified sinusoidal signal.

15. A lamp controller according to claim 2, wherein said decoding means includes means for differentiating the input signal.

16. A lamp controller according to claim 1, wherein said means for controlling controls a gas discharge lamp.

17. A lamp controller according to claim 1, wherein said means for controlling controls a low pressure mercury vapor fluorescent lamp.

18. A lamp controller according to claim 1, wherein said decoding means decodes perturbations according to said third technique in the form of a phase cut in the nominal waveform of the input signal.

19. A lamp controller according to claim 1, wherein said nominal waveform is sinusoidal and said fundamental period is a half-cycle of a full-wave rectified sinusoidal signal.

20. A lamp controller according to claim 1, wherein said decoding means includes identifying means for identifying the control technique of control commands on said input signal as either one of any two control techniques of said first, second and third control techniques.

21. A lamp controller according to claim 1, wherein said controller includes power inputs for receiving an AC power signal for powering said controller, and said receiver is coupled to said power inputs for receiving control commands carried by said AC power signal.

22. A lamp controller according to claim 1, further comprising:
   a pair of mains input terminals for receiving an AC mains voltage carrying said input signal, said receiver being coupled to said mains input terminals for receiving said input signal;
   said means for controlling the operation of the electric lamp comprising:
   (a) ballasting means for providing electrical power to a gas discharge lamp, said ballasting means including (i) a DC input at which a substantially constant DC voltage is received, (ii) a dim input separate from said DC input for receiving a dimming signal from said receiver and (iii) first control means for controlling the electrical power supplied to the gas discharge lamp at a level corresponding to a characteristic of the dimming signal; and
   (b) power supply means connected to said mains input terminals for supplying the substantially constant DC voltage to said DC input of said ballasting means; and
   said dimming signal supplied by said receiver being independent of the DC voltage provided by said power supply means at said DC input of said ballasting means.

23. A ballast according to claim 22, further comprising rectifier means connected to said mains input terminals for providing a full-wave rectified DC output voltage to said power supply means and said receiver, and wherein the fundamental period of the input signal decoded by said receiver is the sinusoidal half-cycle of the rectified DC output voltage from said rectifier means.

24. A lamp ballast according to claim 23, wherein said ballasting means includes (i) inverting means, connected to said DC inputs, said inverting means being adjustable by said first control means to control the power supplied to the discharge lamp, and (ii) said first control means comprises means for deriving a voltage signal representing the lamp power, and first feedback means for adjusting said inverter so that the voltage of the lamp power signal and said dimming signal are equal.

25. A gas discharge lamp ballast for use with a power line controller, said ballast comprising:
   only two mains input terminals for connection to a common line and a hot dimmed line from a power line controller, the hot dimmed line carrying an AC mains voltage including dimming control commands encoded by the power line controller;
   a full bridge rectifier connected to the two mains input terminals for providing a full wave rectified DC output voltage, the rectified DC output voltage including the control commands encoded by the power line controller and having a peak voltage;
   a preconditioner circuit connected to the full-bridge rectifier, said pre-conditioner circuit including an up converter for providing a DC supply voltage at a level higher than the peak voltage of the rectified DC output voltage from said full-bridge rectifier;
   an inverter circuit receptive of the DC supply voltage from said pre-conditioner circuit, said inverter converting the DC supply voltage from said preconditioner to a high frequency AC voltage having a frequency substantially greater than the frequency of the AC mains supply;
   a resonant tank output circuit receptive of the high frequency AC inverter output voltage, said output circuit having lamp connection terminals for connection to a gas discharge lamp, said output circuit providing a substantially sinusoidal lamp current to a gas discharge lamp connected at said lamp terminals; a control circuit connected to the inverter for controlling the AC inverter output voltage, said control circuit having (i) means for receiving a dimming signal separate from the DC output of the pre-conditioner circuit, (ii) means for sensing the power supplied to the gas discharge lamp, and (iii) means for adjusting the AC inverter output frequency fed to said resonant tank output circuit to thereby control the electrical power supplied to the gas discharge lamp at a level corresponding to the voltage of the dimming signal; and
   a dimming interface circuit receptive of the encoded rectified DC output voltage from said full-bridge rectifier, said dimming interface circuit including decoding means for decoding control commands present in the input signal according to any one of at least two of the following:
   (i) a first control technique wherein commands are indicated by the phase angle of a phase angle cut in the nominal waveform;
   (ii) a second control technique wherein commands are indicated by the number of fundamental periods between start and stop points of the command, the stop and start points being fundamental periods having a nominal voltage less than the nominal waveform; and
   (iii) a third control technique wherein commands are indicated by an occurrence signature of a preselected perturbation in the nominal waveform occurring within a control period of a pre-selected number of fundamental periods; and
   said dimming interface circuit further including means coupled to said decoding means for generating a said dimming signal corresponding to the dimming command decoded by said decoding means.

26. A ballast according to claim 25, wherein said preconditioner circuit maintains said DC voltage at a substantially constant level.

27. A receiver for use with a controller for an electric lamp, said receiver comprising:
1) input means for receiving an input signal carrying control commands, said input signal having a fundamental period with a nominal voltage waveform; and
2) decoding means for decoding control commands present in the input signal according to at least two of:
   (i) a first control technique wherein commands are indicated by the phase angle of a phase angle cut in the nominal waveform;
   (ii) a second control technique wherein commands are indicated by the number of fundamental periods between start and stop points of the command, the stop and start points being comprising fundamental periods having a nominal voltage less than the nominal waveform; and
   (iii) a third control technique wherein commands are indicated by an occurrence signature of a pre-selected perturbation in the nominal waveform within a control period of a pre-selected number of fundamental periods.

28. A receiver according to claim 27, wherein said decoding means decodes control commands from any of said three control techniques.

29. A receiver according to claim 28, wherein:
said decoding means includes first means for decoding control commands according to said first control technique, second means for decoding control commands according to said second control technique, third means for decoding control commands according to said third control technique, and identifying means for identifying the control technique of commands according to any of said first, second and third techniques and for activating the respective one of said first, second and third means for decoding corresponding to the control technique identified by said identifying means.

30. A receiver according to claim 29, wherein said decoding means includes means for generating a first detection signal for each occurrence of (i) a said phase cut in said first control technique and (ii) a said perturbation in said third control technique.

31. A receiver according to claim 30, wherein said means for generating said first detection signal includes means for differentiating the input signal.

32. A receiver according to claim 30, wherein said means for generating said first detection signal generates a said first detection signal when said perturbation for said third control technique is a phase cut.

33. A receiver according to claim 30, wherein said identifying means first tests for the presence of control commands according to said first control technique by counting the number of first detection signals generated in a first pre-determined time period.

34. A receiver according to claim 33, wherein in the absence of control commands according to said first control technique, said identifying means then tests for the presence of control commands according to said second technique; if the control commands according to said second technique are identified, said identifying means activates said second means for decoding and if control commands according to said second technique are not identified, said identifying means activates said third means of said decoding means.

35. A receiver according to claim 34, wherein said identifying means includes means for generating a second detection signal in response to the presence of a said start and stop point according to said second control technique.

36. A receiver according to claim 35, wherein said identifying means tests for the presence of commands according to said second control technique by counting the number of said second detection signals generated in a second pre-determined time period.

37. A receiver according to claim 36, further including means for generating a control signal corresponding to a command decoded by said decoding means.

38. A receiver according to claim 36, wherein said nominal waveform is sinusoidal and said fundamental period is a half-cycle of a full-wave rectified sinusoidal signal.

39. A receiver according to claim 27, wherein said decoding means includes means for differentiating the input signal.

40. A receiver according to claim 27, wherein said decoding means decodes perturbations according to said third technique in the form of a phase cut in the nominal waveform of the control signal.

41. A receiver according to claim 27, wherein said decoding means includes identifying means for identifying the control technique of control commands on said input signal as either of said any two control techniques of said first, second and third control techniques.

42. A method of controlling an electric lamp, said method comprising the steps of:
a) receiving an input signal carrying control commands, said signal having a fundamental period with a nominal voltage waveform;
b) identifying the presence in said input signal of control commands according to any two of:
   (i) a first control technique wherein commands are indicated by the magnitude of a phase angle cut in the nominal waveform;
   (ii) a second control technique wherein commands are indicated by the number of fundamental of the between start and stop points of the command, the stop and start points being fundamental periods having a nominal voltage less than the nominal waveform; and
   (iii) a third control technique wherein commands are indicated by an occurrence signature of a pre-selected perturbation in the nominal waveform within a control period of a pre-selected number of fundamental periods;
c) decoding a control command present according to the identified one of said techniques; and
d) controlling the operation of the electric lamp in response to the decoded command.

43. A method according to claim 42, wherein said identifying and decoding steps include identifying and decoding commands from any of said three control techniques.

44. A method according to claim 43, wherein said decoding step includes generating a first detection signal for each occurrence of (i) a said phase cut in said first control technique and (ii) a said perturbation in said third control technique.

45. A method according to claim 44, wherein said step of generating said first detection signal includes the step of differentiating the input signal.

46. A method according to claim 45, wherein said identifying step first tests for the presence of control commands according to said first control technique by counting the number of first detection signals generated in a pre-determined time period.

47. A method according to claim 46, wherein said identifying step, in the absence of control commands according to said first control technique, includes the step of testing for the presence of control commands according to said second technique.

48. A method according to claim 47, wherein said identifying step includes the step of generating a second detection signal in response to the presence of a said start and stop point according to said second technique.

49. A method according to claim 48, wherein said identifying step includes the step of testing for the presence of commands according to said second control technique by counting the number of said second detection signals generated in a second pre-determined time period.

50. A method according to claim 43, wherein said nominal waveform is sinusoidal and said fundamental period is a half-cycle of a full-wave rectified sinusoidal signal.

51. A method according to claim 42, wherein said step of controlling an electric lamp includes controlling a gas discharge lamp.

52. A method according to claim 42, wherein said step of controlling an electric lamp includes controlling a low pressure mercury vapor fluorescent lamp.

53. A method according to claim 42, wherein said input signal received is a sinusoidal AC mains signal for powering a lamp controller.

54. A lamp controller according to claim 1 further comprising a power supply for deriving a substantially constant DC voltage, wherein said controlling means comprises a ballast circuit which receives said DC voltage as its operating voltage, wherein said receiver derives a dimming signal which is independent of said constant DC voltage, and means for supplying said dimming signal to a dim control input of the ballast circuit.

* * * * *